United States Patent [19]

Matsuo et al.

[11] Patent Number: 5,414,547
[45] Date of Patent: May 9, 1995

[54] LIQUID CRYSTAL DISPLAY DEVICE AND MANUFACTURING METHOD THEREFOR

[75] Inventors: Mutsumi Matsuo; Ichio Yudasaka; Kiyohiko Kanai; Katsumi Nagase; Takashi Inoue, all of Nagano, Japan

[73] Assignee: Seiko Epson Corporation, Tokyo, Japan

[21] Appl. No.: 87,734
[22] PCT Filed: Nov. 27, 1992
[86] PCT No.: PCT/JP92/01562
§ 371 Date: Jul. 16, 1993
§ 102(e) Date: Jul. 16, 1993
[87] PCT Pub. No.: WO93/11455
PCT Pub. Date: Jun. 10, 1993

[30] Foreign Application Priority Data

Nov. 29, 1991 [JP] Japan .................. 3-316916
Aug. 18, 1992 [JP] Japan .................. 4-219428

[51] Int. Cl.⁶ .................. G02F 1/1343; G02F 1/1335
[52] U.S. Cl. .................. 359/67; 359/59; 359/87
[58] Field of Search .................. 359/67, 87, 59, 54

[56] References Cited

U.S. PATENT DOCUMENTS

| | | | |
|---|---|---|---|
| 4,740,782 | 4/1988 | Aoki et al. | 359/59 |
| 4,778,258 | 10/1988 | Parks et al. | 359/59 |
| 4,867,537 | 9/1989 | Aoki et al. | 359/68 |
| 4,881,797 | 11/1989 | Aoki et al. | 359/59 |
| 5,083,853 | 1/1992 | Ueki et al. | 359/54 |
| 5,126,865 | 6/1992 | Sarma | 359/59 |
| 5,142,392 | 8/1992 | Ueki et al. | 359/67 |
| 5,282,070 | 1/1994 | Nishida et al. | 359/87 |

FOREIGN PATENT DOCUMENTS

| | | |
|---|---|---|
| 179922 | 5/1986 | European Pat. Off. . |
| 317063 | 5/1989 | European Pat. Off. . |
| 0342925 | 11/1989 | European Pat. Off. . |
| 306820 | 12/1989 | Japan . |
| 236522 | 9/1990 | Japan . |
| 3-198030 | 8/1991 | Japan . |

OTHER PUBLICATIONS

Mikami et al.; "A High Resolution TFT-LCD for Workstation"; EID90-130; vol. 90, No. 431, Feb. 8, 1991; pp. 59–63.

Primary Examiner—William L. Sikes
Assistant Examiner—Kenneth Parker
Attorney, Agent, or Firm—Oliff & Berridge

[57] ABSTRACT

As shown in FIG. 8, black matrices (216) made of molybdenum silicide layers (216bb . . . ) also are, for each of plural pixel regions (201bb . . . ), provided on a transparent substrate (209) having a matrix array. The molybdenum layers (216bb) are insulated and separated from data lines (202a, 202b, gate lines 203a, 203b) and surrounding molybdenum silicide layers (216ab, 216ba . . . ) on the boundary regions with surrounding pixel regions, but are electrically connected to a pixel electrode (206) of its pixel region (201bb). The outer end of the molybdenum silicide layer (216bb) and the outer end of the pixel electrode (206) coincide with each other.

34 Claims, 17 Drawing Sheets

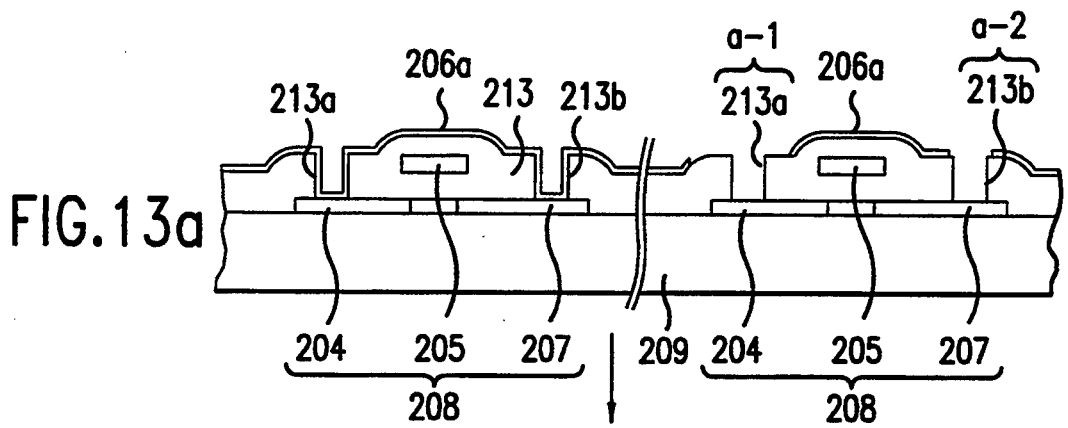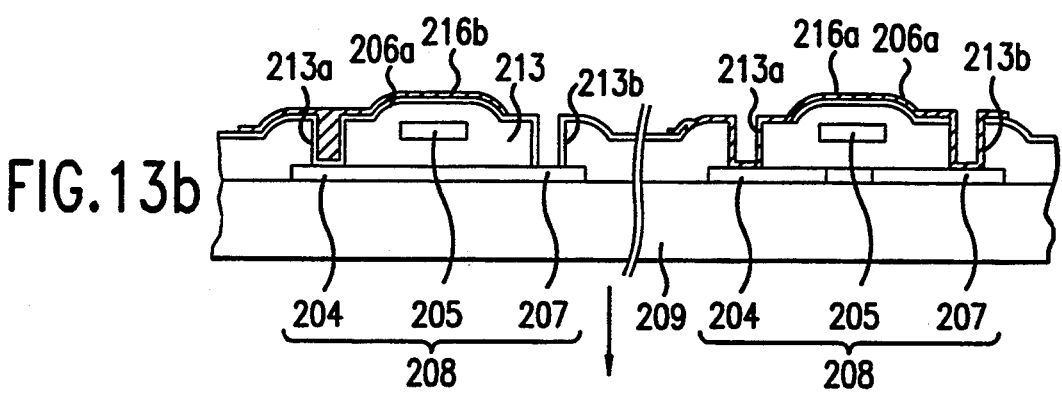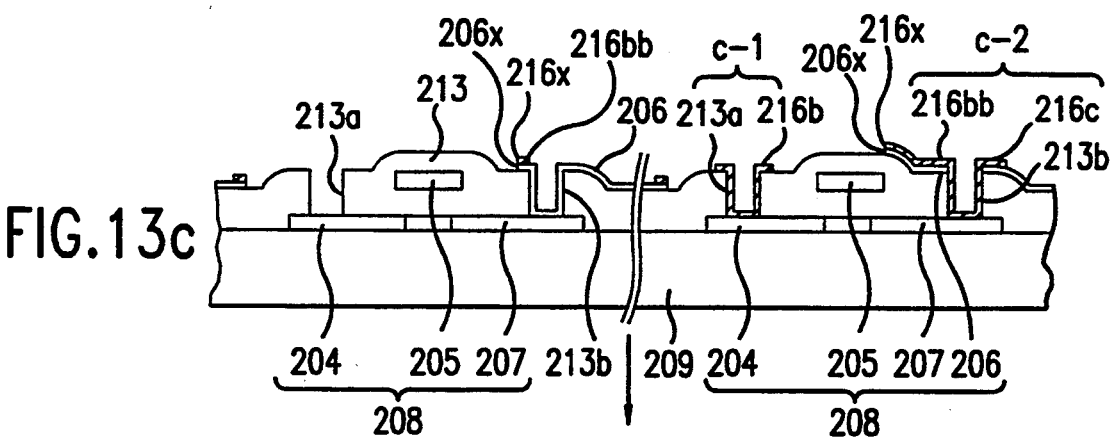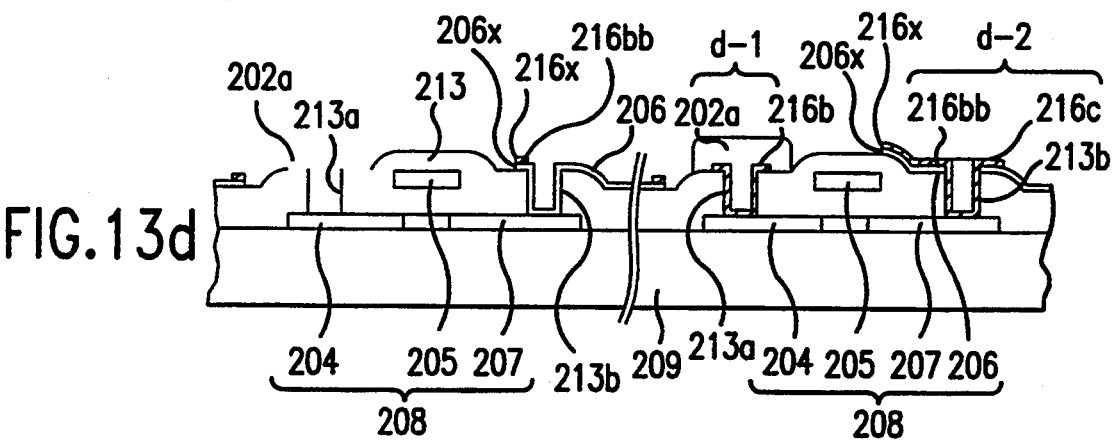

LIQUID CRYSTAL DISPLAY DEVICE AND MANUFACTURING METHOD THEREFOR

FIELD OF THE INVENTION

The present invention relates to a liquid crystal display device, and more particularly to the structure of a black matrix formed adjacent to an active matrix substrate.

BACKGROUND ART

In a liquid crystal display device which is a typical flat-panel-type display, a liquid crystal material 540 is, as shown in FIGS. 28 and 29, enclosed between a transparent substrate 509 in which data lines (source lines) 502a, 502b . . . for supplying an image signal and gate lines 503a, 503b . . . for transmitting a scanning signal are disposed to form a lattice and each of pixel regions 501aa, 501ab, 501ac, 501ba, 501bb, 501bc, 501ca, 501cb, 501cc . . . is sectioned and formed, and another transparent substrate 530 (an opposite substrate) on which a common electrode 533 is formed. By controlling a potential to be applied to a position between common electrode 533 and a pixel electrode 506 of each of the pixel regions 501aa, 501ab . . . via a thin-film transistor (TFT) 508, the state of orientation of the liquid crystal in each of the pixel regions 501aa, 501ab . . . is changed.

A liquid crystal device of the foregoing type encounters a problem in that light leakage (designated by an arrow A) through a gap between, for example, the data line 502a and the pixel electrode 506 deteriorates the display quality. Another problem arises in that a reverse tilt domain region, in which the state of orientation of the liquid crystal becomes disordered due to an influence of an electric field between the data line 502a and the pixel electrode 506, is generated at a position inside of the outer periphery of the pixel electrode 506, and the display quality deteriorates due to this generated region. Therefore, in order to improve the precise clearness of the display of each pixel, a light-shielding black matrix 531 is formed on the other transparent substrate 530 to correspond to a boundary region between pixel regions. Furthermore, the two transparent substrates 509 and 530 are arranged to face each other so as to cause the black matrix 531 to be positioned in the boundary region between the pixel regions so that the quality of display is maintained. If a positional deviation takes place between the boundary regions of the pixel regions and the black matrix 531, the display quality deteriorates. Therefore, the black matrix 531 is given a large marginal width to prevent the foregoing positional deviation.

However, in the circumstance in which the liquid crystal display device has been required to have a larger frame size and to display an image of an improved quality, the conventional arrangement, in which the width of the black matrix is increased, lowers the aperture ratio (the area ratio of a region capable of displaying an image) and thus causes a problem in that the improvement in the display quality is hindered. Accordingly, the inventor of the present invention suggests an arrangement in which the black matrix is formed on the transparent substrate having the active matrix array formed thereon to prevent the positional deviation between the boundary regions of the pixel regions and the black matrix, and to set the width of the black matrix to a minimum width. The inventor of the present invention has first disclosed a liquid crystal display device, described as a comparative example, shown in FIGS. 30 and 31. Referring to these drawings, data lines 502a, 502b . . . and gate lines 503a, 503b . . . are disposed to form a lattice on the surface of a transparent substrate 509 so that each of pixel regions 501aa, 501ab . . . is sectioned and formed. Along the boundary region of each of the pixel regions 501aa, 501ab . . . a black matrix 517 is formed. The black matrix 517 is formed on the surface of a TFT 508 in, for example, a pixel region 501bb, while interposing interlayer insulating films 513 and 515. The TFT 508 is composed of a source 504 to which a data line 502a is electrically connected, a gate electrode 505 to which a gate line 503a is electrically connected, and a drain 507 to which a pixel electrode 506 is electrically connected.

The black matrix 517 is insulated and separated from the data line 502a, the gate 503a and the pixel electrode 506. In the liquid crystal display device constituted as described above, each pixel region and the black matrix 517 can be aligned with each other at an excellent accuracy while eliminating the necessity of providing an unnecessary margin for the width of the black matrix 517. Therefore, the aperture ratio of the liquid crystal device is not sacrificed. However, the liquid crystal display device encounters another problem. Since a potential is not applied to the black matrix 517 and accordingly it is in a floating state, the potential of the black matrix changes depending upon an operational state of the liquid crystal display. The potential change causes the state of orientation of the liquid crystal present between the pixel electrode 506 and the common electrode of the other transparent substrate to become disordered. As a result, the display quality deteriorates. Since the black matrix 517 is commonly used for all of the pixel regions 501aa, 501ab . . . , a short circuit that takes place between the black matrix 517 and any one of the pixel electrodes 506, the data lines 502a, 502b, the gate lines 503a or 503b in the pixel region 501bb will cause a total display defect of the liquid crystal display device.

SUMMARY OF THE INVENTION

Accordingly, the present invention provides an optimal structure of a black matrix formed on the same substrate as a matrix array, so as to realize a liquid crystal display device having an increased aperture ratio while preventing the display quality and the reliability from being sacrificed, by adapting the following means to the liquid crystal display device.

The liquid crystal display device according to the present invention is characterized by an arrangement comprising a first pixel region, among plural pixel regions, formed on the surface of a transparent substrate by sectioning with data lines and gate lines, wherein the first pixel region includes a thin film transistor having a source electrically connected to a data line and a gate electrode electrically connected to a gate line, a pixel electrode to which a potential can be applied via a drain of the thin film transistor, and a conductive and light shielding layer formed in a boundary region between the first pixel region and the second regions located adjacent to the first pixel region to constitute a black matrix, insulated and separated from the data line, the gate line and pixel electrodes of the second pixel regions, and electrically connected to the pixel electrode of the first pixel region.

It is preferable that the conductive and light shielding layer has an outer end positioned on a boundary region between the first pixel region and the second pixel regions.

A structure may be employed in which the first pixel region has the conductive and light shielding layer in all boundary regions between the second pixel regions, and the first pixel region is separated from these second pixel regions by the conductive and light shielding layer. Another structure may be employed in which the first pixel region has conductive light shielding layers in two boundary regions out of all of its boundary regions with the second pixel regions, and is separated from the second pixel regions by the conductive and light shielding layers it has in these two boundary regions and by the conductive and light shielding layers that are present adjacent to two other boundary regions located adjacent to the second pixel regions.

It is preferable that substantially the entire surface of the data line is in a state in which it is, via an interlayer insulating film, covered with at least either the conductive and light shielding layer of the corresponding pixel region or with the conductive and light shielding layer of the second pixel region adjacent to the data line.

Structures may be employed for the pixel electrode and the conductive and light shielding layer in which either the pixel electrode or the conductive and light shielding layer is electrically connected to the TFT drain via a connection hole in an interlayer insulating film, and the other is electrically connected to that pixel electrode or conductive and light shielding layer. Another structure may be employed in which the pixel electrode and the conductive and light shielding layer are formed adjacent to an upper-layer-side interlayer insulating film formed on the surface of a lower-layer-side interlayer insulating film, and are electrically connected to each other via a connection hole in the upper-layer-side interlayer insulating film.

Another structure may be employed in which either the pixel electrode or the conductive and light shielding layer is formed on the surface of the other so that they are electrically connected. In this case, it is preferable that the outer ends of the pixel electrode and the conductive and light shielding layer substantially coincide with each other. In order to achieve this, a method of manufacturing the liquid crystal display device includes a step of patterning a lower one of the pixel electrode and the conductive and light shielding layer so that the outer end of an upper layer and of a mask used in patterning the upper layer are used as masks.

It is preferable for the present invention that either the pixel electrode or the conductive and light shielding layer is electrically connected to the drain via a conductive, stacked electrode that is electrically connected to the drain via the connection hole in the interlayer insulating film, and the other is electrically connected to that pixel electrode or conductive and light shielding layer. In this case, it is preferable that the stacked electrode layer also has light transmissivity, for example, the stacked electrode layer is made of an ITO layer.

If the structure having the stacked electrode layer is employed, it is preferable that the outer end of the pixel electrode is extended to reach a position above the data line so as to maintain a wide formation region.

It is preferable that the stacked electrode layer is formed to extend to a non-formation region in which the thin film transistor is not formed, and the pixel electrode and the stacked electrode layer are electrically connected to each other in the non-formation region, that is, on a flat region to which projections and pits of the thin film transistor are not located.

It is preferable that the present invention comprises the data line that includes a first data line electrically connected to the source of the thin film transistor via a first connection hole in the interlayer insulating film and a second data line electrically connected to the surface of the first data line to form a multi-wiring structure, and the stacked electrode layer includes a first stacked electrode layer electrically connected to the drain of the thin film transistor via a second connection hole in the interlayer insulating film and a second stacked electrode layer electrically connected to the surface of the first stacked electrode layer. In this case, it is preferable that formation be made by mutually using the processes in which the first data line and the first stacked electrode layer are made of a same material, and also the second data line and the second stacked electrode layer are made of a same material.

It is preferable that a drive circuit formed on the same substrate on which an active matrix having the first and second pixel regions is formed includes a multi-layer wiring structure in which wiring layers are electrically connected through an interlayer insulating film formed adjacent to the active matrix that is the same interlayer insulating film used to form the active matrix.

It is preferable that the gate electrode and the gate line according to the present invention have intrinsic polycrystalline silicon layers or polycrystalline silicon layers containing phosphorus by an amount of $1 \times 10^{20}/cm^3$ or less, and a silicide layer made of a high melting point metal formed on the surface of the polycrystalline silicon layer and constituting the multi-wiring structure. In this case, a method of manufacturing the liquid crystal display device comprises: a step of forming a first polycrystalline silicon film to serve as a source and drain region and a channel region on the surface of a transparent substrate; a step of forming a gate electrode insulating film on the surface of the polycrystalline silicon film; a step of depositing a second polycrystalline silicon film below the gate electrode and the gate line; a step of dispersing phosphorus into the second polycrystalline silicon film at a temperature of 850° C. or lower; a step of depositing a silicide layer of high melting point metal above the gate electrode and the gate line; and a step of simultaneously patterning the second polycrystalline silicon film and the silicide layer of the high melting point metal to form the gate electrode and the gate line.

In the present invention, in order to form a holding capacitance, it is preferable that at least either the pixel electrode or the conductive and light shielding layer has an outer end located adjacent to the forward gate line at a position above the forward gate line to form an overlapping portion.

BRIEF DESCRIPTION OF THE DRAWINGS

FIGS. 13 (a) to (d) respectively are cross sectional views, each illustrating a portion of a process of a method of manufacturing the liquid crystal display device shown in FIG. 11;

DETAILED DESCRIPTION OF PREFERRED EMBODIMENTS

Embodiment 1

Figure 1:
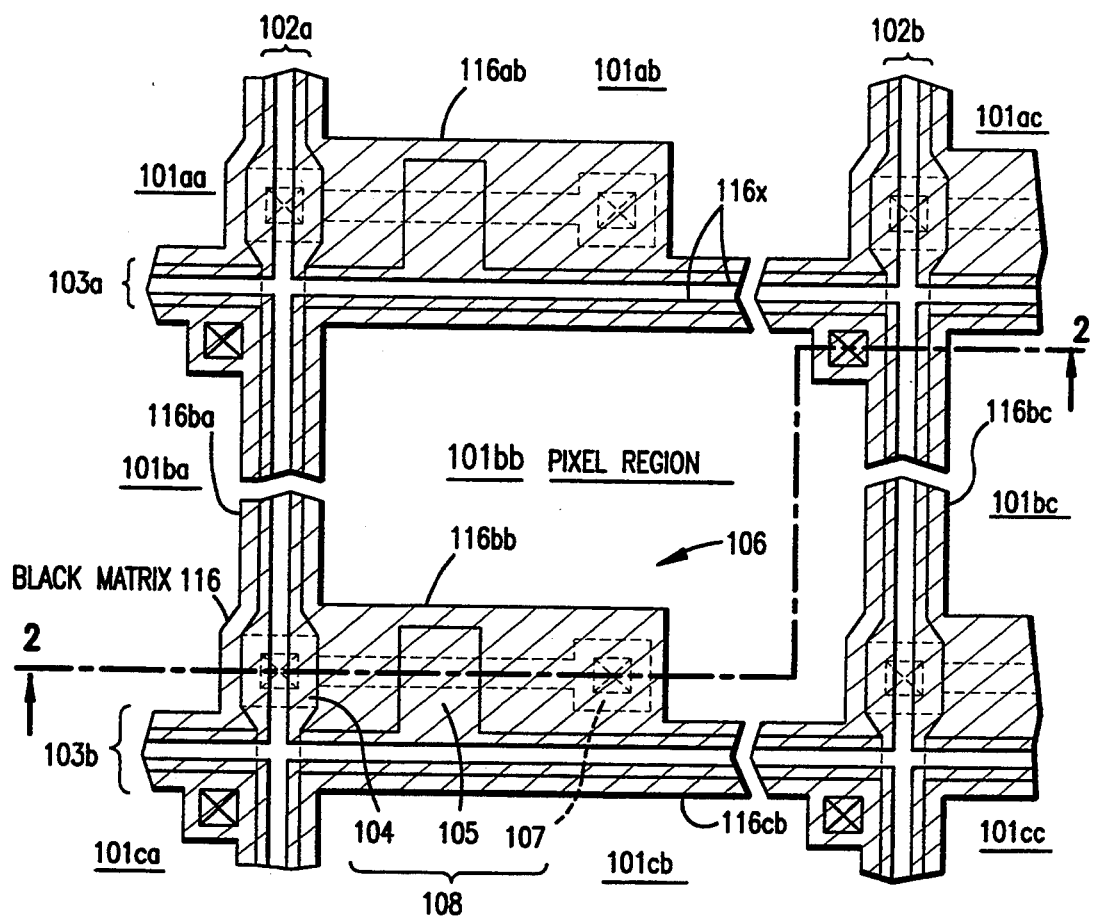
FIG. 1 is a plan view illustrating a portion of a matrix array of a liquid crystal display device according to Embodiment 1 of the present invention.
Figure 2:
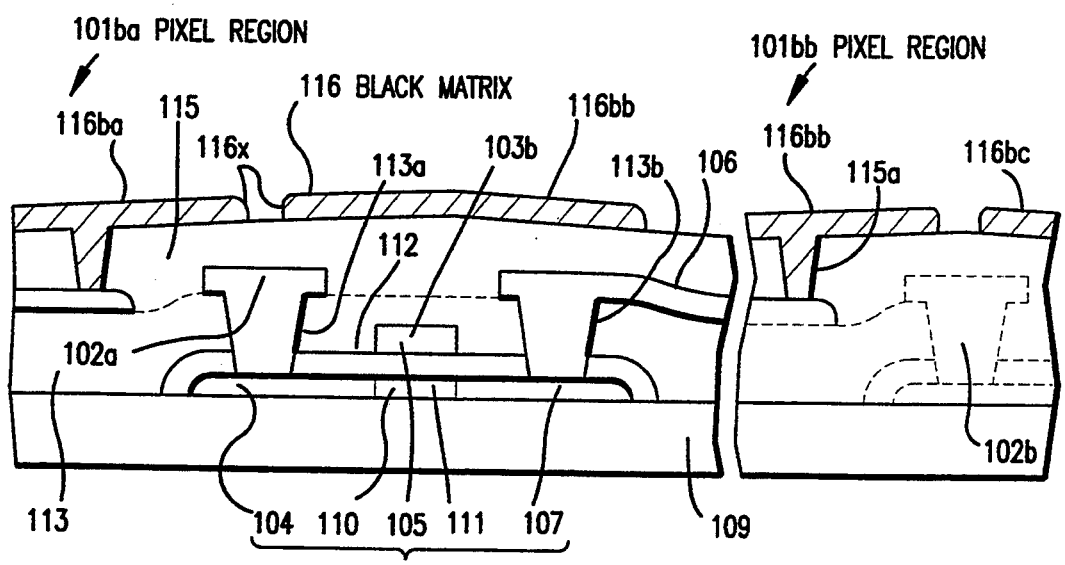
FIG. 2 is a cross sectional view taken along line 2—2 of FIG. 1.

FIG. 1 is a plan view illustrating a portion of a matrix array of a liquid crystal display device according to Embodiment 1 of the present invention. FIG. 2 is a cross sectional view taken along line 2—2 of FIG. 1.

In the liquid crystal display device according to this embodiment, vertical data lines 102a, 102b . . . (signal lines) and horizontal gate lines 103a, 103b . . . (scanning lines) are disposed to form a lattice. Pixel regions 101aa, 101ab, 101ac, 101ba, 101bb, 101bc, 101ca, 101cb, 101cc . . . are sectioned and formed between the aforesaid lines.

The structure of a pixel region will now be described with reference to the pixel region 101bb (a first pixel region) for example. Pixel regions 101ab, 101ba, 101cb and 101bc (second pixel regions) are positioned adjacent to the pixel region 101bb. Pixel region 101bb includes a TFT 108 that is constituted by a source 104 to which a data line 102a is electrically connected, a gate electrode 105 to which a gate line 103b is electrically connected, and a drain 107 to which a pixel electrode 106 is electrically connected. The pixel electrode 106 is a transparent electrode made of ITO and is formed over substantially the entire surface of the pixel region 101bb.

As for the cross sectional structure of the TFT 108, a polycrystalline silicon layer 110 is formed on the surface of a transparent substrate 109 for supporting the overall body of the liquid crystal display device. The polycrystalline silicon layer 110 is doped with phosphorus as an n-type impurity except for a channel region 111, which is an intrinsic polycrystalline silicon region. As a result, the source 104 and the drain 107 are formed. The phosphorus is doped by ion injection performed while masking with the gate electrode 105 on a gate electrode oxidized film 112 in such a manner that the source 104 and the drain 107 are self-aligned. A lower-layer-side interlayer insulating film 113 made of a silicon oxide film is formed on the surface of the TFT 108. The lower-layer-side interlayer insulating film 113 has a first connection hole 113a and a second connection hole 113b formed therein. The data line 102a made of a low-resistance metal layer, such as an aluminum layer or an alloy layer containing aluminum, is electrically connected to the source 104 via the first connection hole 113a. A pixel electrode 106 is electrically connected to the drain 107 via the second connection hole 113b.

The liquid crystal display device according to this embodiment has an upper-layer-side interlayer insulating film 115 formed on the surface of the transparent substrate 109 thereof, and a chrome layer 116bb (a conductive light shielding layer) having light shielding characteristics and conductivity formed on the surface of the upper-layer-side interlayer insulating film 115. In the pixel region 101bb, the chrome layer 116bb is electrically connected to the pixel electrode 106 via a connection hole 115a in the upper-layer-side interlayer insulating film 115 located at a diagonal position relative to the region in which the TFT 108 is formed, that is, at an end portion in which the pixel region 101bb and the pixel regions 101ab, 101ac and 101bc are in contact with one another. The chrome region 116bb is formed so that its outer end 116x is positioned above a boundary region located between the pixel region 101bb and the pixel regions 101ab, 101ba, 101cb and 101bc, that is, above the data lines 102a and 102b and the gate lines 103a and 103b. Furthermore, the data lines 102a and 102b and the gate lines 103a and 103b are insulated and separated from each other via the interlayer insulating films 113 and 115. In addition, conductive light shielding layers such as the chrome layer 116bb are similarly formed in each of the pixel regions in such a manner that the conductive light shielding layer is insulated and separated from chrome layers in adjacent pixel regions. For example, the outer end 116x of the chrome layer 116bb and the outer ends 116x of the chrome layers 116ab, 116ba, 116cb and 116bc are insulated and separated from each other above the data lines 102a, 102b, and the gate lines 103a, 103b. Therefore, all of the chrome layers, for example, the chrome layer 116bb is insulated and separated from each pixel electrode of the pixel regions 101ab, 101ba, 101cb and 101bc. As a result, a potential can be applied to the chrome layer 116bb from the pixel electrode 106 disposed in the same pixel region 101bb. However, a potential cannot be supplied from a pixel electrode in another pixel region. Furthermore, substantially the entire surface of the data line 102a is covered with the inter-layer insulating film 115 and the end portions of the chrome layers 116bb and 116ba so that the potential applied to the data line 102a does not affect the liquid crystal positioned on the surface of the data line 102a. The chrome layer 116bb also is formed adjacent to the forward gate line 103a to have a wide overlapping area therewith. The chrome layer 116bb is electrically connected to the pixel electrode 106. As a result, the chrome layer 116bb is in a state where it acts as a charge storage capacitance.

This embodiment has an arrangement in which the liquid crystal display device is constituted by enclosing the liquid crystal between the transparent substrate 109, on which the black matrix 116 is formed, and the other side transparent substrate (omitted from illustration) on which a color filter and a common electrode are formed. In response to a signal transmitted through the data lines 102a, 102b . . . , and the gate lines 103a, 103b . . . , the potential generated between the common electrode and each pixel electrode 106 is controlled. As a result, the state of orientation of the liquid crystal in each pixel region is changed to display information.

In a conventional liquid crystal display device, a black matrix corresponding to the boundary region of the pixel regions of the transparent substrate 109 is formed on the transparent substrate having the common electrode. However, in the liquid crystal display device according to this embodiment, the fact that, for example, the chrome layer 116bb is formed in the boundary regions of the pixel region 101bb and the surrounding pixel regions is utilized to use each of the chrome layers 116bb, 116ab, 116ba, 116cb, 116cc . . . as a black matrix. Therefore, the necessity of forming the black matrix on the transparent substrate on which the common electrode is formed can be eliminated. Therefore, the aligning accuracy between the boundary regions of the pixel regions and the black matrix 116 required for the conventional technology does not cause a problem. Hence, the width of the black matrix 116 can be minimized to correspond to the width of the boundary regions between the pixel regions, that is, the data lines 102a, 102b . . . and the gate lines 103a, 103b. Therefore, the aperture ratio of the liquid crystal display device can be improved.

The chrome layer 116bb is insulated and separated from the pixel electrodes of the data lines 102a, 102b, gate lines 103a, 103b, and adjacent pixel regions 101ab, 101ba, 101cb and 101bc. Furthermore, the chrome layer 116bb is electrically connected to the pixel electrode 106 in the same pixel region 101bb. Therefore, the potential of the chrome layer 116bb is in a state where the same potential as that of the pixel electrode 106 is always supplied to it regardless of the state of the operation of the liquid crystal display device. As a result, the potential of the chrome layer 116bb does not disorder the state of orientation of the liquid crystal present in the pixel region 101bb between the pixel electrode 106 and the common electrode. Therefore, excellent display quality can be obtained. Furthermore, the black matrix 116 is composed of the chrome layers 116bb . . . which are electrically independent in each pixel region. If, for example, the chrome layer 116bb and the data line 102a are in a short-circuit state in the pixel region 101bb, only the pixel region 101bb cannot display an image, that is, the influence of the short circuit causes only a point display defect. Therefore, the reliability of the liquid crystal display device is satisfactory.

Embodiment 2

Figure 3:
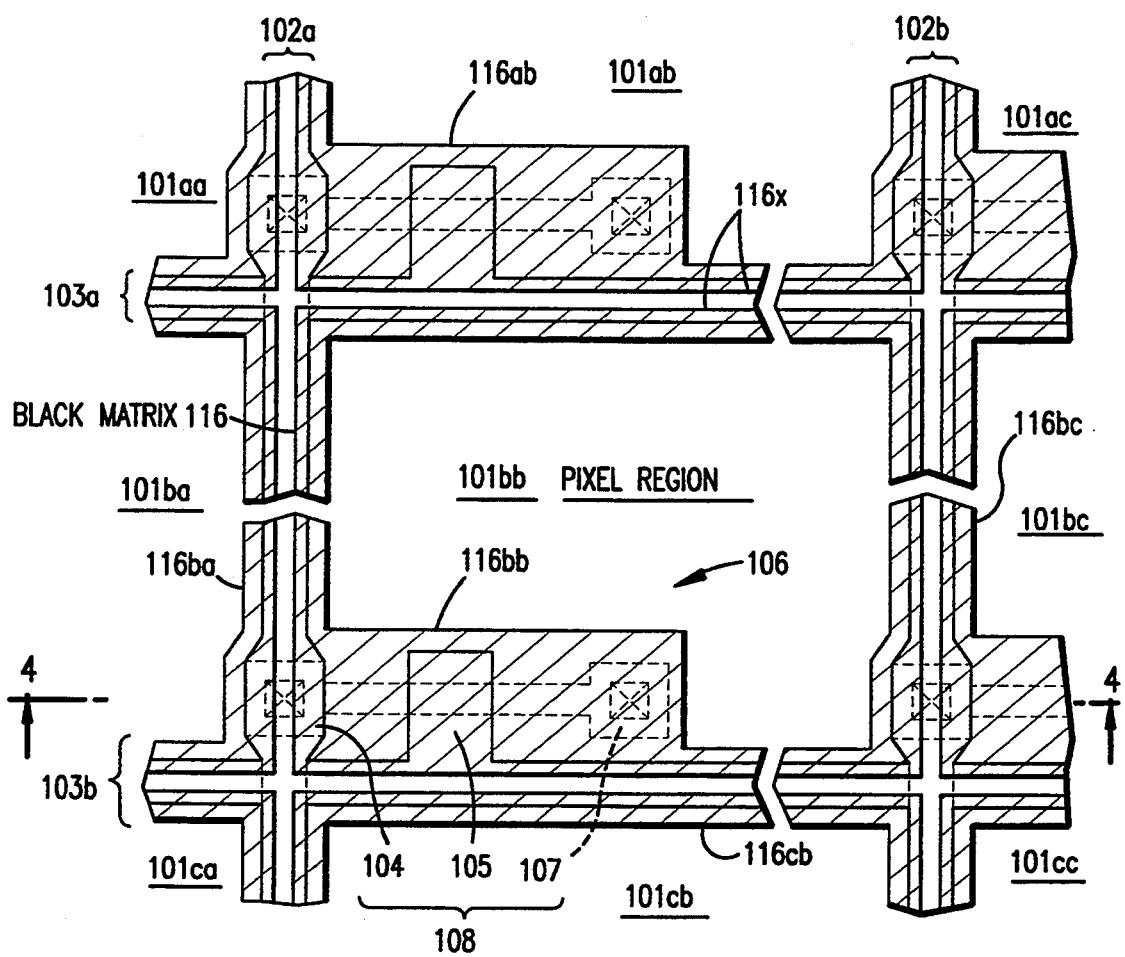
FIG. 3 is a plan view illustrating a portion of a matrix array of a liquid crystal display device according to Embodiment 2 of the present invention.
Figure 4:
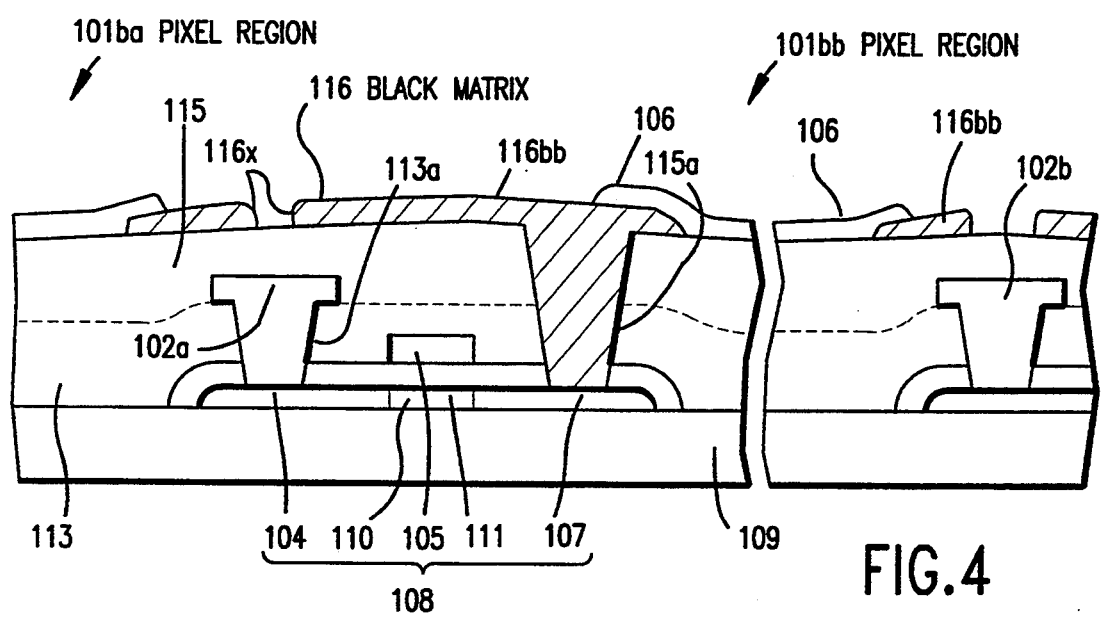
FIG. 4 is a cross sectional view taken along line 4—4 of FIG. 3.

FIG. 3 is a plan view illustrating a portion of a matrix array of a liquid crystal display device according to Embodiment 2 of the present invention. FIG. 4 is a cross sectional view taken along line 4—4 of FIG. 3. Elements having the same functions as the elements of the liquid crystal display device according to Embodiment 1 are given the same reference numerals and their detailed descriptions are omitted here.

In the liquid crystal display device according to this embodiment, the TFT 108 also is formed on the surface of the transparent substrate 109 in, for example, the pixel region 101bb (the first pixel region) among the plural pixel regions 101aa, 101ab, 101ac, 101ba, 101bb . . . formed by sectioning performed by wiring the vertical data lines 102a, 102b, . . . and the horizontal gate lines 103a, 103b, . . . to form a lattice. The lower-side interlayer insulating film 113 made of a silicon oxide film is deposited on the surface of the TFT 108. The data line 102a is electrically connected to the source 104 via the first connection hole 113a. The upper-side interlayer insulating film 115 is formed on their surfaces. The chrome layer 116bb (the conductive light shielding layer) having light shielding characteristics and conductivity is electrically connected to the drain 107 via the connection hole 115a that penetrates the foregoing lower-side and upper-side interlayer insulating films 113 and 115. The pixel electrode 106 to be applied with the potential via the drain is electrically connected to the chrome layer 116bb and is formed on the surface of the upper-side interlayer insulating film 115. Similar to Embodiment 1, the chrome layer 116bb is formed so that its outer end 116x is positioned above the boundary region between the pixel region 101bb and the adjacent pixel regions 101ab, 101ba, 101bc and 101cb (the second pixel regions), that is, on the regions in which the data lines 102a, 102b, and gate lines 103a, 103b are formed. The data lines 102a, 102b, and the gate lines 103a, 103b are insulated and separated by the interlayer insulating films 113 and 115. Furthermore, the conductive light shielding layer, such as the chrome layer 116*bb*, is formed in each of the pixel regions as the chrome layers 116*ab*, 116*ba*, 116*bc*, 11*cb* etc. Each of the chrome layers is insulated and separated from the chrome layer in the adjacent pixel regions. Therefore, the potential is applied to the chrome layer 116*bb* via only the pixel electrode 106 in the same pixel region 101*bb*. The surface side of the data line 102*a* is covered with the interlayer insulating film 115 and the end portions of the chrome layers 116*bb* and 116*ba* so that the potential applied to the data line 102*a* does not affect the liquid crystal located over the surface of the data line 102*a*.

Also in the liquid crystal display device described above, the black matrix 116 is, in addition to the matrix array, formed adjacent to the transparent substrate 109 to correspond to the boundary region between the pixel regions. Therefore, the width of the black matrix can be set to a minimum width, resulting in a high aperture ratio of the liquid crystal display device. Furthermore, the chrome layer 116*bb* is electrically connected to only the pixel electrode 106 in the same pixel region 101*bb*, resulting in a state where the same potential as that of the pixel electrode 106 is applied to the chrome layer 116*bb*, regardless of the state of operation of the liquid crystal display device. Therefore, the potential of the chrome layer 116*bb* does not disorder the state of orientation of the liquid crystal present between the pixel electrode 106 and the common electrode. Since all of the chrome layers respectively are independent in the corresponding pixel regions, even if the chrome layer and a data line or the like are short-circuited in one pixel region 101*bb*, the influence of this causes only a point defect to occur in the display. Therefore, the excellent reliability of the liquid crystal display device can be maintained.

Embodiment 3

Figure 5:
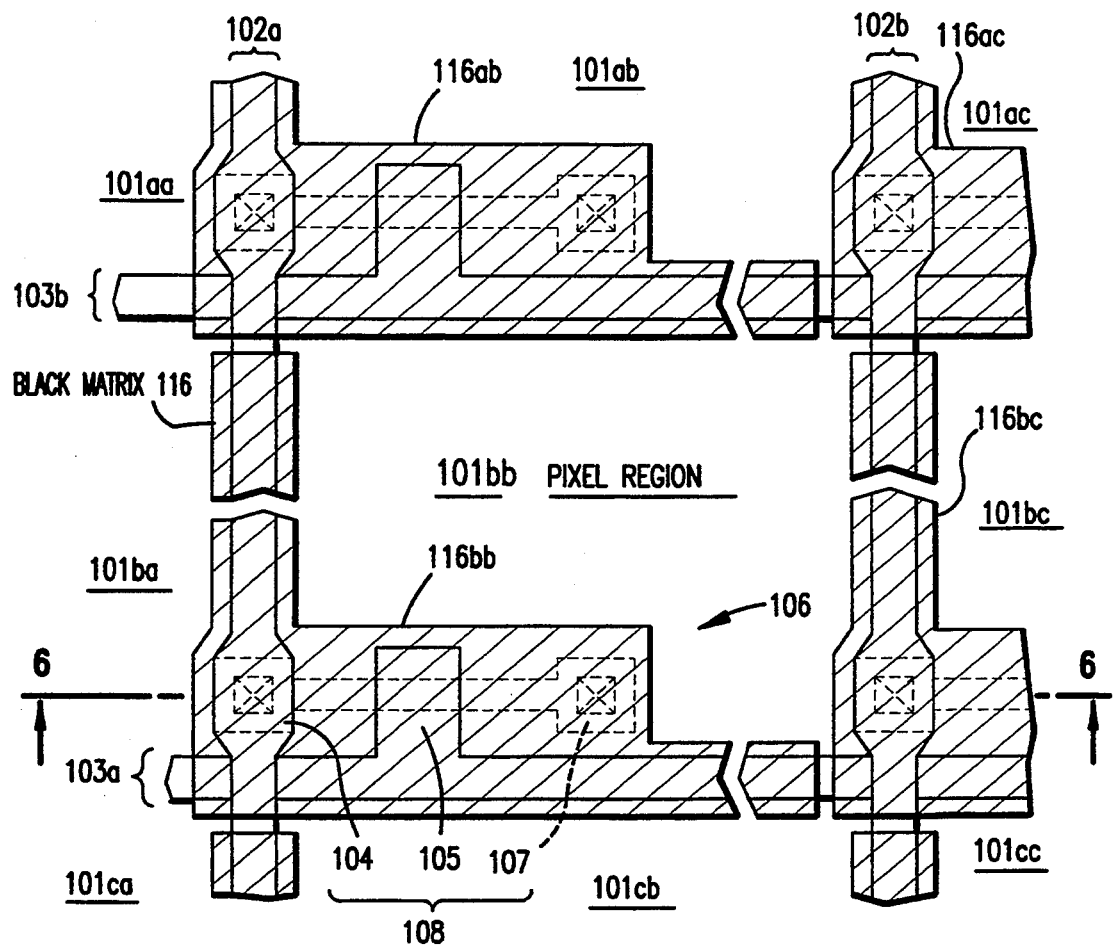
FIG. 5 is a plan view illustrating a portion of a matrix array of a liquid crystal display device according to Embodiment 3 of the present invention.
Figure 6:
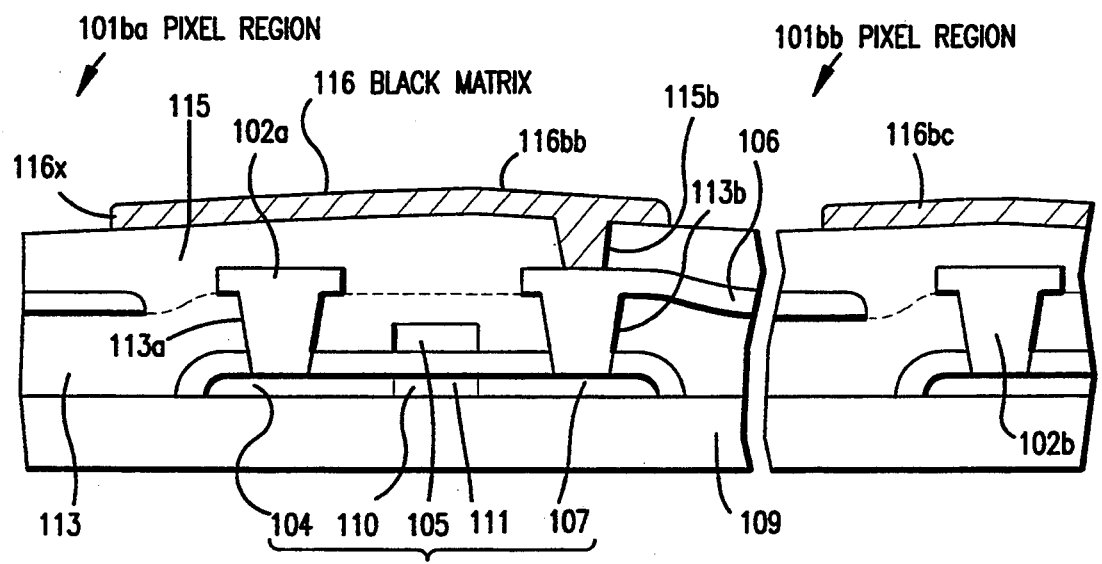
FIG. 6 is a cross sectional view taken along line 6—6 of FIG. 5.

FIG. 5 is a plan view illustrating a portion of a matrix array of a liquid crystal display device according to a third embodiment of the present invention. FIG. 6 is a cross sectional view taken along line 6—6 of FIG. 5. Elements having functions corresponding to the elements of the liquid crystal display device according to Embodiment 1 are given the same reference numerals and their detailed descriptions are omitted here.

In the liquid crystal display device according to this embodiment, the data line 102*a* also is electrically connected to the source 104 of the TFT 108 formed on the surface of the transparent electrode 109 in the pixel region 101*bb* (the first pixel region) via the first connection hole 113a of the lower-side interlayer insulating film 113. The pixel electrode 106 is electrically connected to the drain 107 via the second hole 113*b* in the lower-side interlayer insulating film. The chrome layer 116*bb* formed on the surface of the upper-side interlayer insulating film 115 is electrically connected to the pixel electrode 106 via the connection hole 115a.

In this embodiment, the outer end 116*x* of the chrome layer 116*bb* is located beyond the data line 102*a* and the gate line 103*a* so as to extend into the adjacent pixel regions 101*ba* and 101*cb*. On the other hand, in the pixel region 101*bb*, the chrome layer 116*bb* is not formed in the boundary region between the pixel region 101*bb* and the adjacent pixel regions 101*bc* and 101*ab*. The chrome layer 116*bb* is formed into an L-shape on adjacent boundary regions. In the boundary region of the pixel region 101*bb* adjacent to the pixel region 101*bc*, the end portion of the chrome layer 116*bc* formed in the pixel region 101*bc* is located beyond the data line 102*b* so as to extend into the pixel region 101*bb*. In the boundary region of the pixel region 101*bb* adjacent to the pixel region 101*ab*, the end portion of the chrome layer 116*ab* formed in the pixel region 101*ab* is located beyond the gate line 103*b* so as to extend into the pixel region 101*bb*. As a result, the pixel region 101*bb* is formed by sectioning with the chrome layer 116*bb* formed to correspond to the pixel region 101*bb* and the chrome layers 116*bc* and 116*ab* formed to correspond to the adjacent pixel regions 101*bc* and 101*ab*.

In this embodiment, the fact that the chrome layers 116*bb*, 116*bc*, 116*ab* . . . section the pixel regions 101*bb* . . . is utilized to use the chrome layers 116*bb* . . . as the black matrix 116.

Therefore, the aperture ratio of the liquid crystal display device according to this embodiment is raised. Furthermore, the black matrix 116 is not in the floating state, so that its potential does not disorder the liquid crystal. In addition, the black matrix 116 is constituted by the chrome layers 116*bb*, 116*bc*, 116*ab* . . . that are electrically independent in each pixel region. This limits the influence of a short-circuit of one of the chrome layers 116*bb*, 116*bc*, 116*ab* . . . , causing only a point defect in the display.

This embodiment is different from the liquid crystal displays according to Embodiment 1 and Embodiment 2 in that the end portions of the chrome layers 116*bb*, 116*bc*, 116*ab* . . . are not formed adjacently over a wide area on the data lines 102*a*, 102*b* . . . and gate line 103*a*, 103*b*, etc. Therefore, even if the chrome layers 116*bb*, 116*bc*, 116*ab* . . . are formed with an ordinary accuracy in a process in which the black matrix 116 is formed, their short-circuit is prevented. Furthermore, the pixel region 106 is formed on the surface of the interlayer insulating film 113, while the chrome layers 116*bb*, 116*bc*, 116*ab* . . . are formed on the surface of the interlayer insulating film 115. That is, the pixel region 106 and chrome layers 116*bb*, 116*bc*, 116*ab* . . . in the adjacent region are formed in different layers. Therefore, even if they are disposed adjacently, no short-circuit takes place. As a result, the black matrix 116 comprised of the chrome layers 116*bb*, 116*bc*, 116*ab* . . . , electrically independent in each pixel region, can be formed easily.

Figure 7:
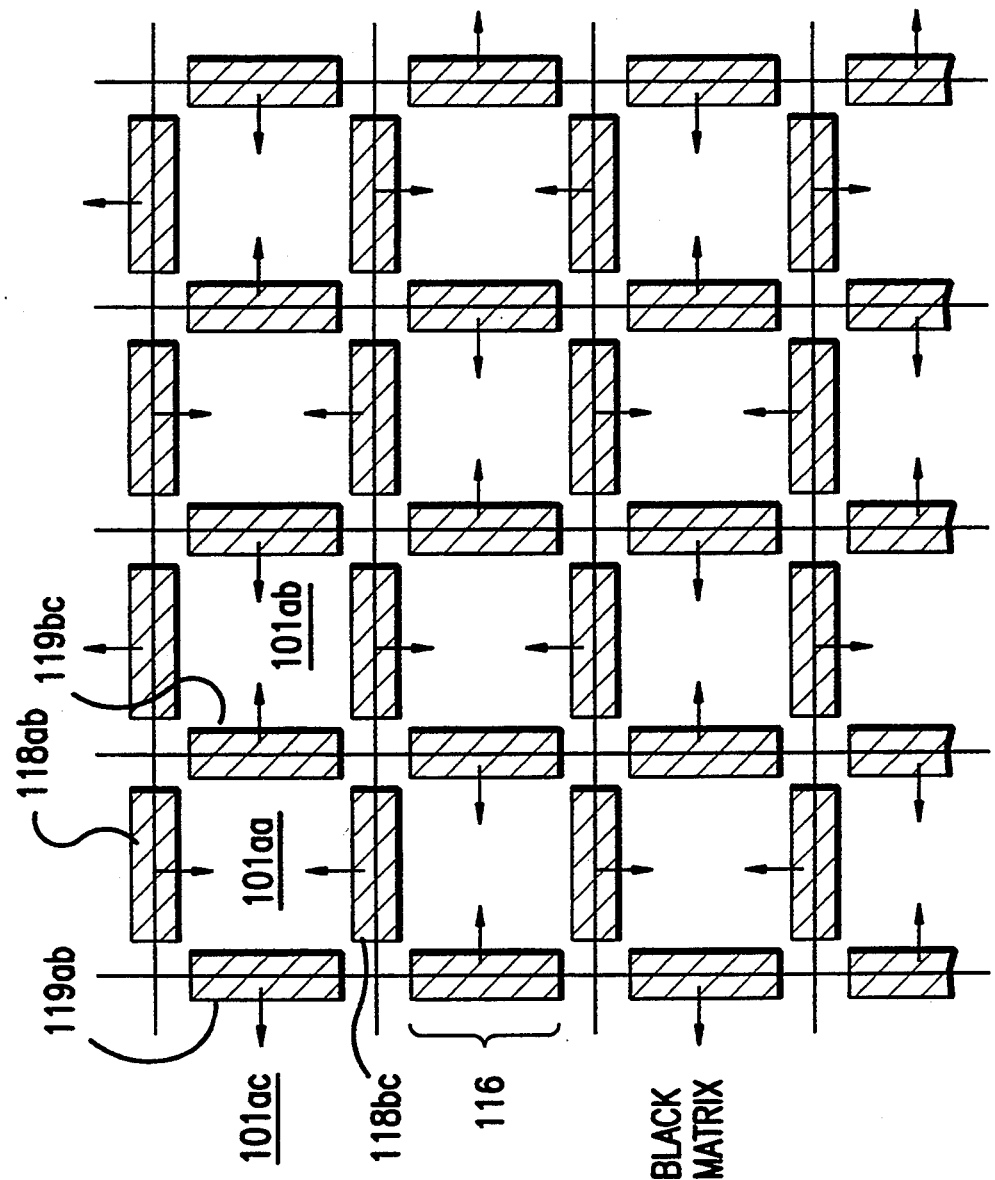
FIG. 7 is a schematic plan view illustrating a matrix array of a liquid crystal display device according to a modification of Embodiment 3 of the present invention.

In Embodiment 3, the structure is arranged so that the chrome layers 116*bb*, 116*bc*, 116*ab* . . . serving as the conductive light shielding layers are disposed in two boundary regions among the boundary regions of adjacent pixel regions. The pixel region is sectioned by the foregoing chrome layer and the adjacent chrome layers in the pixel regions adjacent to the chrome layer at the other two boundary regions. A modification of Embodiment 3 may be employed in which the black matrix 116 is formed as shown in FIG. 7 so that chrome layers 118*ab*, 118*bc*, 119*ab*, 119*bc* serve as the conductive light insulating layers and are formed in two oppositely facing boundary regions among the boundary regions. In this case, the chrome layers 118*ab* and 118*bc* are electrically connected to the pixel region 101*aa*, layer 119*bc* is electrically connected to the pixel region and layer 119*ab* is electrically connected to pixel region 101*ac* . . . positioned in directions designated by "→" shown in FIG. 7.

The shape, structure, material and the like of each element for constituting the liquid crystal display device must be set to predetermined conditions depending upon the size and the purpose of the liquid crystal display device to be manufactured. Therefore, they are not limited.

Although the chrome layer is employed as the conductive light shielding layer for constituting the black matrix in each embodiment, the material of this layer is not limited. A metal layer such as titanium or aluminum, a silicon layer, or a silicide compound such as molybdenum silicide or tungsten silicide may be used if the material has conductivity and light shielding characteristics.

Embodiment 4

Figure 8:
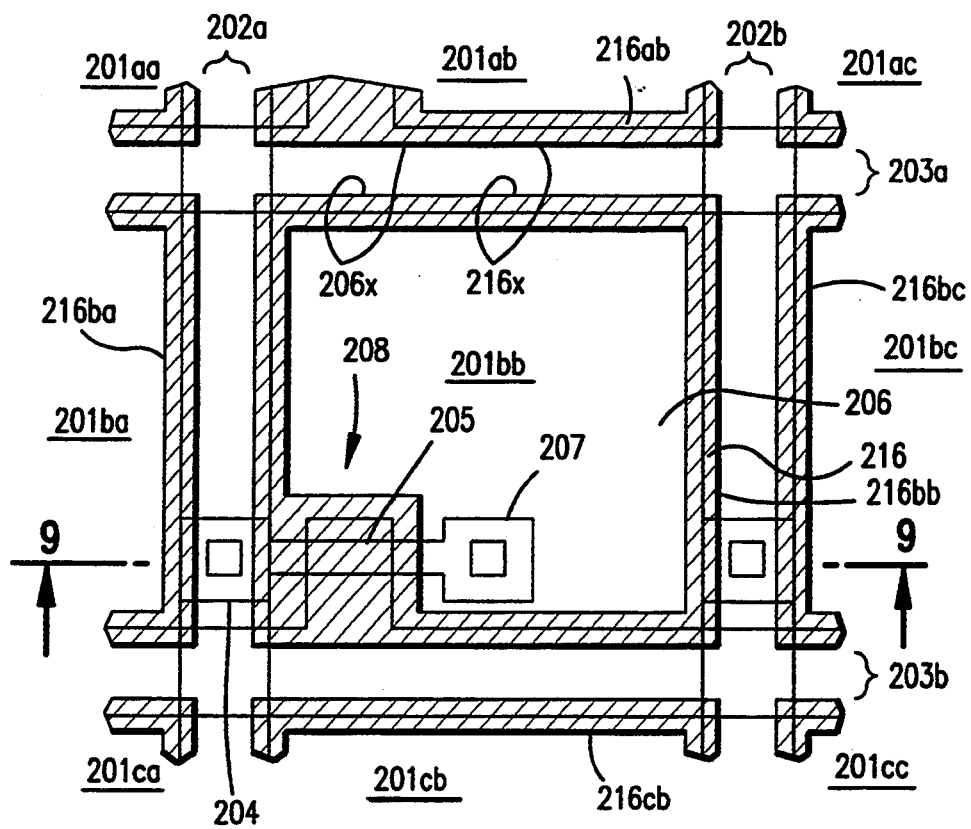
FIG. 8 is a plan view illustrating a portion of a matrix array of a liquid crystal display device according to Embodiment 4 of the present invention.
Figure 9:
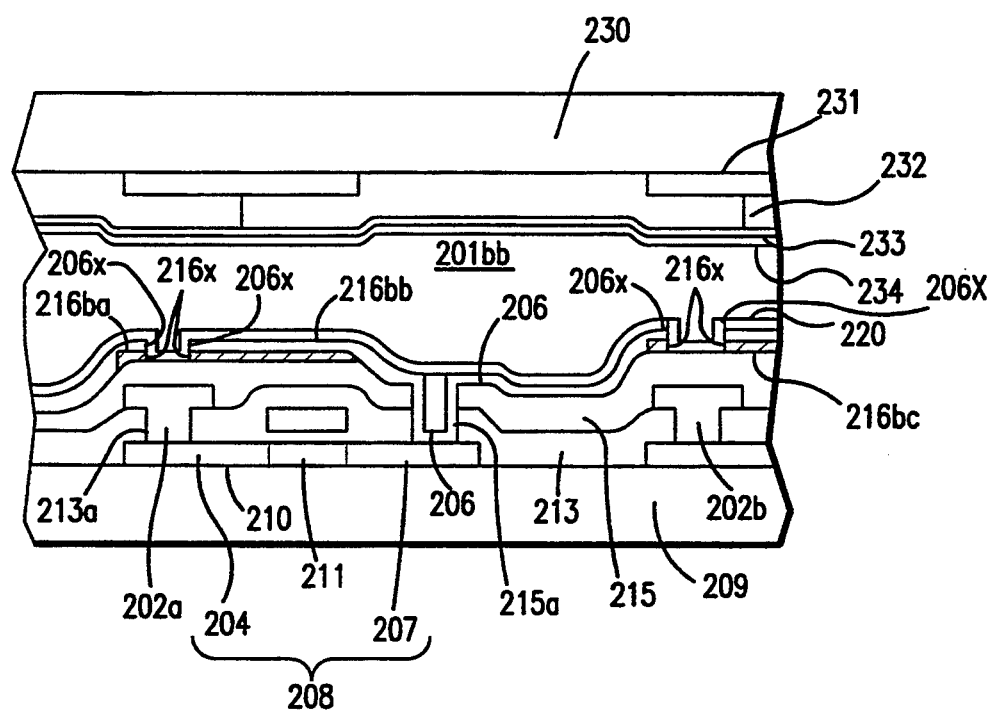
FIG. 9 is a cross sectional view taken along line 9—9 of FIG. 8.
Figure 10A:
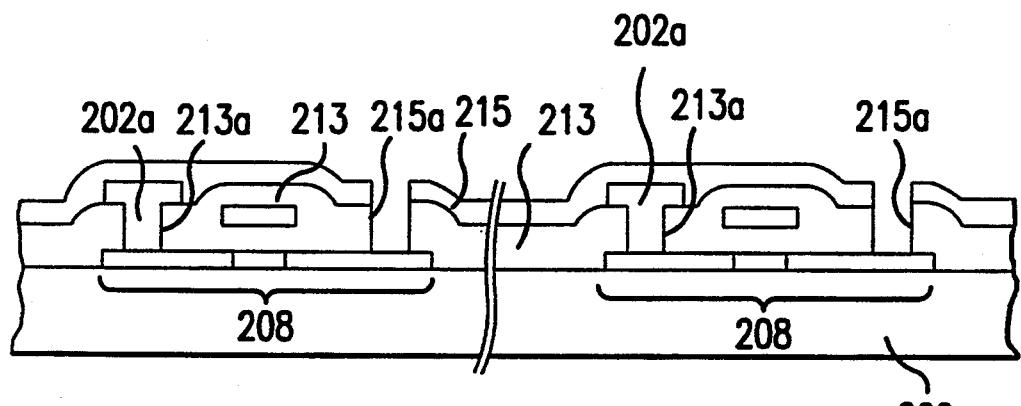
FIGS. 10 (a) to (c) respectively are cross sectional views, each illustrating a portion of a process of a method of manufacturing the liquid crystal display device shown in FIG. 8.
Figure 10B:
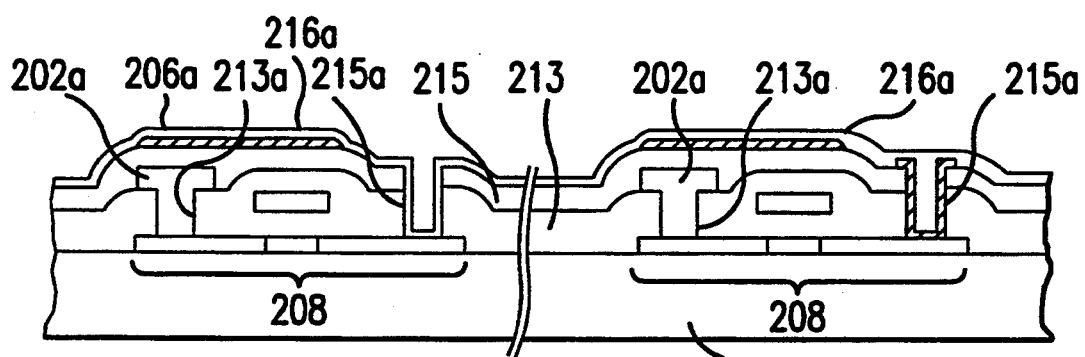
Figure 10C:
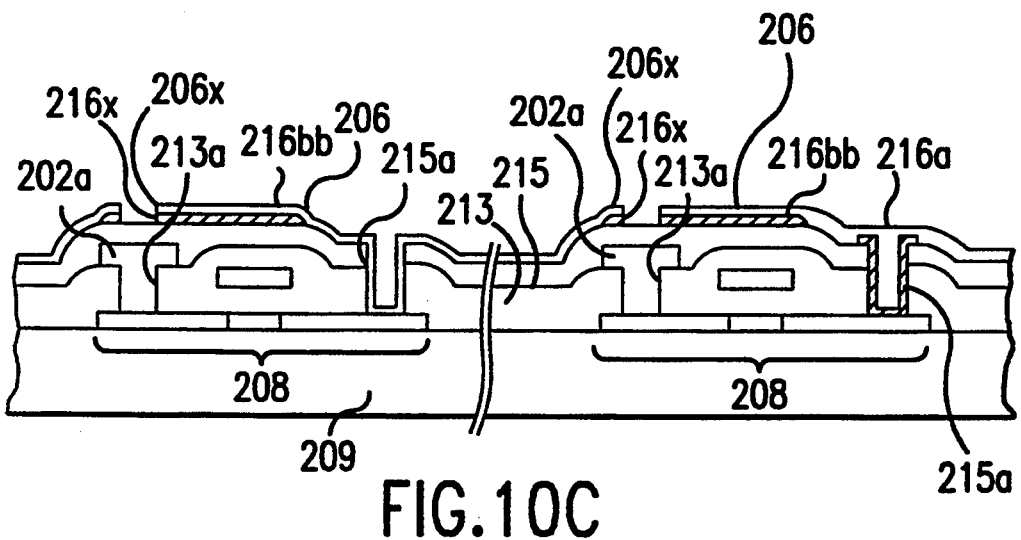

FIG. 8 is a schematic plan view illustrating an active matrix substrate for use in a liquid crystal display device according to Embodiment 4 of the present invention. FIG. 9 is a cross sectional view taken along line 9—9 of FIG. 8.

In the liquid crystal display device according to this embodiment, vertical data lines 202a, 202b . . . (signal lines) and horizontal gate lines 203a, 203b . . . (scanning lines) also are disposed to form a lattice similar to the liquid crystal display device according to Embodiment 1. Pixel regions 201aa, 201ab, 201ac, 201ba, 201bb, 202bc, 201ca, 201cb, 201cc . . . are, by sectioning, formed between the foregoing lines. The structure will now be described while referring to the pixel region 201bb (a first pixel region) for example. A color filter 232 for enabling color display, a common electrode 233 and an opposing-substrate-side orienting film 234 are formed on an opposing-substrate 230 shown in FIG. 9. Furthermore, an opposing substrate side black matrix 231 is formed on the opposing substrate 230. In the liquid crystal display device according to this embodiment, a black matrix also is formed on the active matrix substrate as described later. The opposing-substrate-side black matrix 231 is provided for the purpose of complementing the black matrix formed on the active matrix substrate.

As shown in FIG. 8, the pixel regions 201ab, 201ba, 201cb, 201bc (second pixel regions) are formed adjacent to the pixel region 201bb (the first pixel region). In the pixel region 201bb, a TFT 208 is constituted by a source 204 to which the data line 202a is electrically connected, a gate electrode 205 to which the gate line 203b is electrically connected, and a drain 207 to which a pixel electrode 206 is electrically connected. The pixel electrode 206 is a transparent electrode made of ITO that is a conductive and light transmissible material, the pixel electrode 206 being formed on substantially the entire surface in the pixel region 201bb. The end portions of the pixel electrode 206 are extended to positions above the data lines 202a, 202b, and the gate lines 203a, 203b. Furthermore, each pixel electrode 206 has a wide overlapping area on the forward gate line 203a.

As for the cross sectional structure of the TFT 208, a polycrystalline silicon layer 210 is, as shown in FIG. 9, formed on the surface of a transparent substrate 209 supporting the overall body of the liquid crystal display device.

The polycrystalline silicon layer 210 is doped with phosphorus as an n-type impurity except for a channel region 211 which is an intrinsic polycrystalline silicon region. As a result, the source 204 and the drain 207 are formed. On the surface of the TFT 208, a lower-layer-side interlayer insulating film 213 made of a silicon oxide film is formed. The lower-layer-side interlayer insulating film 213 has a first connection hole 213a. The data line 202a made of an aluminum layer is electrically connected to the source 204 via the first connection hole 213a.

Furthermore, the liquid crystal display device according to this embodiment has an upper-layer-side interlayer insulating film 215 formed on the surface of the lower-layer-side interlayer insulating film 213. The upper-layer-side interlayer insulating film 215 and the lower-layer-side interlayer insulating film 213 have a second connection hole 215a. A pixel electrode 206 is electrically connected to the drain 207 via the second connection hole 215a. The pixel electrode 206 is formed in the pixel region 201bb and the adjacent pixel regions 201ab, 201ba, 201bc and 201cb so that its outer end 206x is positioned above the data lines 202a, 202b, and the gate lines 203a, 203b.

In the liquid crystal display device according to this embodiment, a molybdenum silicide layer 216bb (a conductive and light shielding layer) is formed on the surface of the upper-layer-side interlayer insulating film 215 and below the pixel electrode 206. The molybdenum silicide layer 216bb is formed so that its outer end 216x is positioned above the data lines 202a, 202b, and the gate lines 203a, 203b in the boundary regions between the pixel region 201bb and adjacent pixel regions 201ab, 201ba, 201cb and 201bc, and it aligns with an end 206x of the pixel electrode 206.

The conductive and light shielding layer such as the molybdenum silicide layer 216bb is similarly formed in each of the pixel regions. The molybdenum silicide layer 216bb is in a state where it is insulated and separated from the outer end 216x of each of the molybdenum silicide layers 216ab, 216ba, 216cb and 216bc in the adjacent pixel regions 201ab, 201ba, 201cb and 201bc at positions above the data lines 202a, 202b, and the gate lines 203a, 203b. Therefore, the molybdenum silicide layer 216bb can be applied with the potential from the pixel electrode 206 in the same pixel region 201bb. However, the potential is not applied from any pixel electrode in the other pixel regions. In addition, substantially the entire surface of the data line 202a is covered with the interlayer insulating film 215, the end portions of the molybdenum silicide layers 216bb and 216ba and the end portion of the pixel electrode 206, resulting in that the potential applied to the data line 202a does not affect the liquid crystal placed on the surface of the data line 202a.

The liquid crystal is enclosed between the active matrix and the opposing substrate 230, the active matrix being structured as described above and formed on the surface of the transparent substrate 209 in a state where an orienting film 220 is formed on the surface of the pixel electrode 206 and the molybdenum silicide layer 216bb. As a result, display utilizing the orientation of the liquid crystal is enabled.

In the liquid crystal display device described above, each of the molybdenum silicide layers 216bb, 216ab, 216ba . . . is utilized as the black matrix 216, resulting in that the necessity of providing the black matrix on the opposing substrate 230 can be eliminated if the data line and the gate line have light shielding characteristics. If the data line or the gate line does not have light shielding characteristics, only a complementary black matrix, such as the black matrix 231 on the opposing substrate, as shown in FIG. 9 is required. Therefore, the width of the black matrix 216 or that of the black matrix 231 on the opposing-side substrate does not need to be widened excessively in order to improve the position alignment accuracy when the two transparent substrates face each other. Since each of the molybdenum silicide layers 216*bb*, 216*ab* . . . are formed to reach the surface of the same transparent substrate of the pixel regions 201*bb*, 201*ab* . . . accuracies in terms of position alignment can be improved. Therefore, the width can be set to a minimum value to correspond to the width of each of the data lines 202*a*, 202*b* . . . and gate lines 203*a*, 203*b* etc. As a result, the aperture ratio of the liquid crystal display device can be raised. Furthermore, the potential of the molybdenum silicide layer 216*bb* is in a state where the same potential as that of the pixel electrode 206 is always applied, thus resulting in that the potential of the molybdenum silicide layer 216*bb* does not disorder the state of orientation of the liquid crystal. As a result, excellent display quality can be obtained.

Even if both the pixel electrode 206 and the black matrix 216 act as electrodes, the outer surface range of the pixel electrode 206 and of the black matrix 216 can be made to coincide with each other. Therefore, a region (a reverse tilt domain region), in which the orientation of the liquid crystal is disordered due to a receipt of undesirable flow of the potential from the foregoing electrodes, can be assuredly covered with the black matrix 216. Furthermore, the black matrix 216 is formed by the molybdenum silicide layers 216*bb* . . . each of which is electrically independent in each pixel region, thus resulting in that only a point defect of the pixel region 201*bb* takes place even if a short circuit occurs between the molybdenum silicide layer 216*bb* and the data line 202*a*. As a result, excellent reliability can be attained from the liquid crystal display device.

Furthermore, the pixel region 201*bb* is formed precisely, corresponding with the tendency of precisely forming the liquid crystal display device, thus resulting in a reduction of the display capacitance in the pixel region 201*bb*. Even if the leakage current is decreased by forming the TFT 208 to have a large off-resistance, the display voltage is lowered during a period in which the gate line 203*b* is not selected. Therefore, the display maintaining characteristics tend to deteriorate. However, the liquid crystal display device according to this embodiment is arranged so that the end portion of the pixel electrode 206 is positioned above the forward gate line 203*a* so that a charge storage capacitance is formed by them. Therefore, the forward gate line 203*a* is in a non-selected state during a period in which the pixel region 201*bb* is being selected, and a reference voltage is accordingly applied to the gate line 203*a*. By utilizing this fact, characteristics for maintaining the voltage applied to the liquid crystal in the pixel region 201*bb* can be improved by storing a charge in the charge storage capacitance.

A portion of a method of manufacturing the liquid crystal display device according to this embodiment will be described while referring to the left portion of the regions shown in FIGS. 10 (*a*) to (*c*). FIGS. 10 (*a*) to (*c*) are cross sectional views illustrating a portion of the process for manufacturing the liquid crystal display device according to this embodiment.

Since a known method can be employed until the TFT 208 is formed on the transparent substrate 209 as shown in FIG. 10 (*a*), the description about it is omitted. After the TFT 208 has been formed, the lower-layer-side interlayer insulating film 213 is formed. Then, the first connection hole 213*a* is formed, and the data line 202*a* made of the aluminum layer is formed to electrically connect the data line 202*a* to the source 204 of the TFT 208. Then, the upper-layer-side interlayer insulating film 215 is formed on the surface of the lower-layer-side interlayer insulating film 213 followed by forming the second connection hole 215*a* in the upper-layer-side interlayer insulating film 215.

Then, the molybdenum silicide layer is deposited, and is patterned as shown in FIG. 10 (*b*) to form the molybdenum silicide layer 216*a*. In this state, the molybdenum silicide layer 216*a* does not yet have the pattern to constitute the black matrix 216.

Then, an ITO layer 206*a* is formed on the surface of the molybdenum silicide layer 216*a*, and the ITO layer 206 is patterned to form the pixel electrode 206 as shown in FIG. 10 (*c*). Then, a mask, used at the time of forming the pixel electrode 206, also is used to pattern the molybdenum silicide layer 216*a*, while also using the pixel electrode 206 as the mask. As a result, the molybdenum silicide layer 216*bb* for forming the black matrix 216 is formed. In the process of patterning the lower layers among the pixel electrode 206 and the molybdenum silicide layer 216*bb*, the outer end of the upper layer, or the mask used to pattern the upper layer, is, as described above, used as the mask at the time of performing patterning.

As a result, a structure can be formed in which the outer end 206*x* of the pixel electrode 206 and the outer end 216*x* of the molybdenum silicide layer 216*bb* coincide with each other, and are positioned above the data line 202*a*. Since a known process can be employed to perform the remaining steps, their description is omitted here.

As described above, the method of manufacturing the liquid crystal display device according to this embodiment has an arrangement in which the pixel electrode 206 is formed by patterning, and the molybdenum silicide layer 216*a* is present below the pixel electrode 206 to protect the lower layer. Therefore, if an etchant of a chloride type is used to pattern the ITO layer 206, a pit or the like of the upper-layer-side interlayer insulating film 215 does not cause the lower data line 202 constituted by the aluminum layer to be damaged by the etchant. Therefore, the data line 202*a* can be freed from disconnection or the like, and the reliability of the liquid crystal display device can be improved.

The cross sectional view showing the manufacturing process in the right portion of each of FIGS. 10 (*a*) to (*c*) illustrates a modification of the foregoing manufacturing method.

The molybdenum silicide layer 216*a* is left in the second connection hole 215*a* as shown in FIG. 10 (*b*), causing the pixel electrode 206 made of the ITO layer to be electrically connected, via the molybdenum silicide layer 216*bb*, to the drain region 207 made of silicon after the pixel electrode 206 has been formed. As a result, the contact resistance can be reduced as compared with a case where the pixel electrode 206 and the drain region 207 are directly connected to each other, thus resulting in improvement of the display quality.

Although the active matrix substrate formed by either of the manufacturing methods shown in the right and the left regions of FIGS. 10 (*a*) to 10 (*c*) is formed such that the pixel region 206 is formed above the black matrix 216, the present invention is not limited to this construction. A structure may be employed in which the vertical positional relationship between the pixel region 206 and the black matrix 216 is inverted.

Embodiment 5

Figure 11:
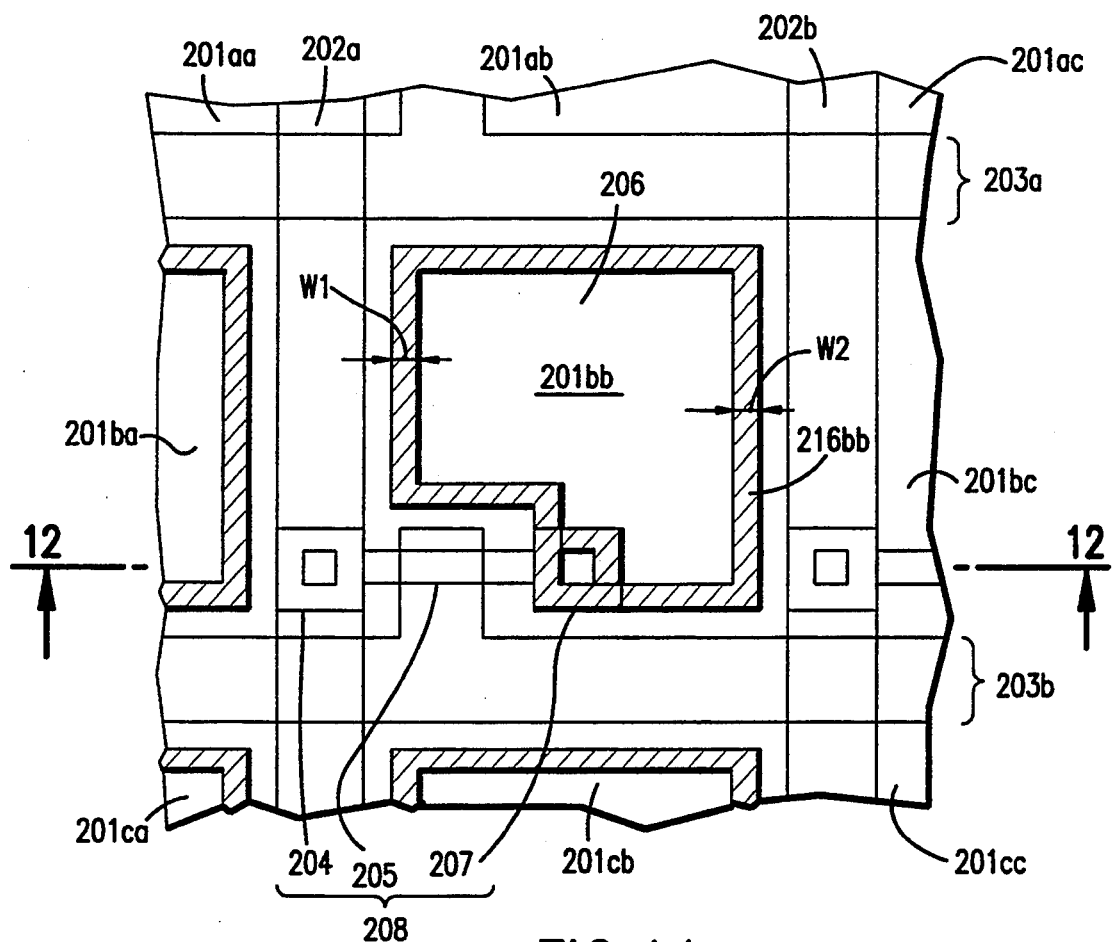
FIG. 11 is a plan view illustrating a portion of a matrix array of a liquid crystal display device according to Embodiment 5 of the present invention.
Figure 12:
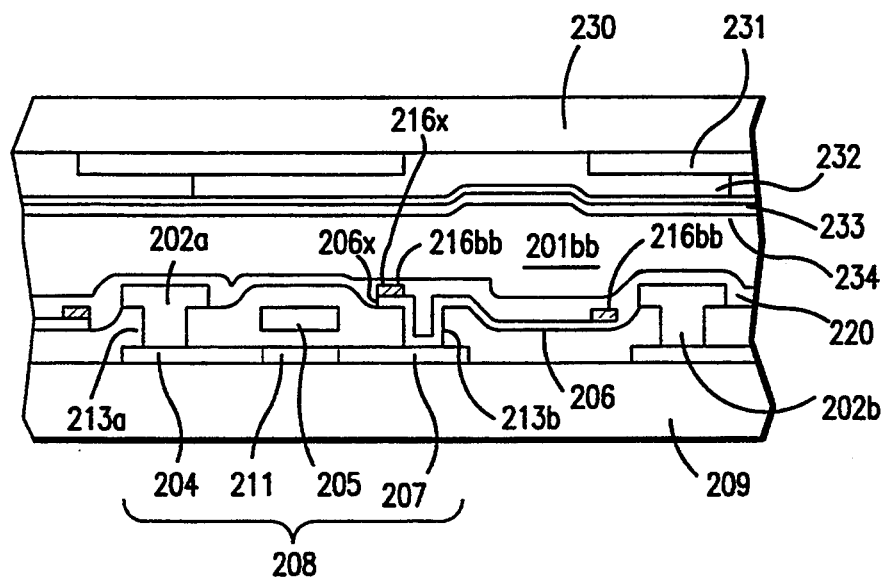
FIG. 12 is a cross sectional view taken along line 12—12 of FIG. 11.

FIG. 11 is a schematic plan view illustrating a portion of an active matrix substrate for use in the liquid crystal display device according to Embodiment 5 of the present invention. FIG. 12 is a cross sectional view taken along line 12—12 of FIG. 11. Elements having functions corresponding to those of the elements of the liquid crystal display device according to Embodiment 4 shown in FIGS. 8 and 9 are given the same reference numerals, and their detailed descriptions are omitted here.

In the liquid crystal display device according to this embodiment, pixel regions 201ab, 201ba, 201cb and 201bc (second pixel regions) also are positioned adjacent to the pixel region 201bb (the first pixel region). In the pixel region 201bb, the TFT 208 is formed by the source 204, the gate electrode 205 and the drain 207. The lower-layer-side interlayer insulating film 213 made of a silicon oxide film is deposited on the surface of the TFT 208. The lower-layer-side interlayer insulating film 213 has the first connection hole 213a and the second connection hole 213b formed therein. The data line 202a made of the aluminum layer is electrically connected to the source 204 via the first connection hole 213a, while the pixel electrode 206 made of the ITO layer is electrically connected to the drain 207 via the second connection hole 213b.

The pixel electrode 206 is formed to reach positions adjacent to the boundary regions between the pixel region 201bb and adjacent pixel regions 201ab, 201ba, 201bc and 201cb. Its outer end 206x is positioned inside the positions at which the data lines 202a, 202b, and the gate lines 203a, 203b are formed. The liquid crystal display device according to this embodiment also has the molybdenum silicide layer 216bb (the conductive and light shielding layer) having the light shielding characteristics and conductivity on the surface of the pixel electrode 206. The molybdenum silicide layer 216bb also is formed to reach positions adjacent to the boundary regions between the pixel region 201bb and adjacent pixel regions 201ab, 201ba, 201bc and 201cb. Its outer end 216x is positioned inside the positions at which the data lines 202a, 202b, and the gate lines 203a, 203b are formed, so as to coincide with the outer end 206x of the pixel electrode 206. As for the width of the molybdenum silicide layer 216bb, it is preferable that the side of the molybdenum silicide layer in which the orientation of the liquid crystal easily can be disordered in the pixel region 201bb has a thick width, and the other side in which the disorder cannot take place easily has a narrow width. Accordingly, the liquid crystal display device according to this embodiment has an arrangement to shield from light the reverse tilt domain region in which the orientation of the liquid crystal adjacent to the data line 202a is disordered by an influence of the charge of the data line 202a, the arrangement being made such that the width W1 of the side of the molybdenum silicide layer 216bb adjacent to the data line 202a is made to be thicker than the width W2 of the side adjacent to the data line 202b. Thus, even if the alignment is deviated, the reverse tilt domain region can be assuredly covered, resulting in the display quality being maintained and the reduction in the aperture ratio being minimized.

Since the liquid crystal display device described above has an arrangement in which each of the molybdenum silicide layers 216bb . . . is utilized as the black matrix, the molybdenum silicide layer 216bb serves as a margin at the time of the position alignment of the opposing-substrate-side black matrix 231, when the side of the active matrix formed adjacent to the transparent substrate 209 and the side of the opposing substrate 230 are caused to face each other. Therefore, accuracy in the position alignment can be disregarded. Furthermore, the potential of the molybdenum silicide layer 216bb is in a state where it is applied with the same potential as that applied to the pixel electrode 206, resulting in that the state of the orientation of the liquid crystal cannot be disordered. Therefore, excellent display quality can be obtained. In addition, the black matrix 216 is constituted by the molybdenum silicide layers 216bb . . . which are electrically independent from one another in each pixel. Therefore, short circuit that takes place in the pixel region 201bb between the molybdenum silicide layer 216bb and the data line 202a will cause only a point defect to occur in the display performed by the pixel region 201bb. As a result, the reliability of the liquid crystal display device is excellent.

Referring to the left portions of FIGS. 13 (a) to (d), a portion of a method of manufacturing the liquid crystal display device according to the present invention will now be described. FIGS. 13 (a) to (d) are cross sectional views illustrating a portion of a manufacturing process of the method of manufacturing the liquid crystal display device according to this embodiment.

Since a known method can be employed in the process until the TFT 208 is formed on the transparent substrate 209 as shown in FIG. 13 (a), its description is omitted here. After the TFT 208 has been formed, the lower-layer-side interlayer insulating film 213 is deposited, followed by forming the first connection hole 213a and the second connection hole 213b in the lower-layer-side interlayer insulating film 213. Then, the ITO layer 206a to form the pixel electrode 206 is formed by sputtering.

As shown in FIG. 13 (b), the molybdenum silicide layer 216a is then deposited, and then only the molybdenum silicide layer 216a is patterned. In this state, the molybdenum silicide layer 216a has not been patterned to have a pattern constituting the black matrix 216. Also the ITO layer 206a has not been patterned to have a pattern constituting the pixel electrode 206.

Then, as shown in FIG. 13 (c), the edge of the molybdenum silicide layer 216a is patterned prior to patterning the ITO layer 206a to form the molybdenum silicide layer 216bb constituting the black matrix. Then, by using the same mask, the ITO layer 206a is patterned so that the pixel electrode 206 is formed. In order to maintain excellent etching accuracy, the molybdenum silicide layer 216a is subjected to plasma etching with $CF_4$ gas, while the ITO layer 206a is, following the plasma etching of the molybdenum silicide layer 216a, subjected to anisotropic etching using a mixture of $CH_4$ gas and $H_2$ gas. As a result, the outer ends 206x and 216x of the pixel electrode 206 and the molybdenum silicide layer 216bb coincide with each other in portions adjacent to the boundary regions between the pixel region 201bb and the adjacent pixel regions 201ab, 201ba, 201bc and 201cb. The plasma etching with the $CF_4$ gas may be performed similarly when using a molybdenum silicide layer or a tungsten silicide layer in place of the molybdenum silicide layer 216a.

Then, the aluminum layers for forming the data lines 202a and 202b are formed followed by performing patterning as shown in FIG. 13 (d), resulting in formation of the data line 202a.

Since a known process may be employed to perform the ensuing steps, its description is omitted.

As described above, according to the method of manufacturing the liquid crystal display device according to the present invention, the outer surface range of the pixel electrode 206 and the outer surface range of the black matrix 216 can be made to coincide with each other even if both the pixel electrode 206 and the black matrix 216 act as electrodes. Therefore, the disorder of the orientation of the liquid crystal caused by the potential from the foregoing electrodes can be assuredly covered with the black matrix 216.

The cross sectional views illustrating the process shown in the right portions of FIGS. 13 (a) to (d) illustrate a modification of the aforesaid manufacturing method.

That is, as shown in FIG. 13 (b), the ITO layer 206a is formed on the lower-layer-side insulating film 213 in a region a-1 and a region a-2 in which the lower-layer-side interlayer insulating film 213 has been formed. Then, the first connection hole 213a and the second connection hole 213b are formed.

Then, the molybdenum silicide layer 216a is formed as shown in FIG. 13 (b). As a result, a state is realized in which the molybdenum silicide layer 216a is electrically connected to the source 204 and the drain 207 of the TFT 208.

Then, the molybdenum silicide layer 216a is patterned as shown in FIG. 13 (c) so that the molybdenum silicide layer 216bb constituting the black matrix 216 is formed. Furthermore, the molybdenum silicide layers 216b and 216c are left in the first and second connection holes 213a and 213b in regions c-1 and c-2. Then, the end portion of the molybdenum silicide layer 216bb is used as a mask to pattern the ITO layer 206a so that the pixel electrode 206 is formed. As a result, a structure is formed in which the outer ends 206x and 216x of the pixel electrode 206 and the molybdenum silicide layer 216bb coincide with each other at positions adjacent to the boundary regions between the pixel region 201bb and adjacent pixel regions 201ab, 201ba, 201bc and 201cb.

Then, the data line 202a is formed on the surface of the molybdenum silicide layer 216b in a region d-1 as shown in FIG. 13 (d) so that a structure is formed in which the data line 202a is electrically connected to the source 204 via the molybdenum silicide layer 216b.

Since a known process may be employed to perform the ensuing steps, its description is omitted.

The aforesaid manufacturing method causes the data line 202a made of the aluminum layer to be connected to the source 204 made of silicon via the molybdenum silicide layer 216b. This results in the prevention of an invasion of the silicon by a eutectic reaction with the aluminum. As a result, the TFT 208 can be formed from a thin silicon film, resulting in an improvement in the ON/OFF ratio.

In the region d-2 shown in FIG. 13 (d), the pixel electrode 206 made of the ITO layer and the drain 207 made of silicon are electrically connected via the molybdenum silicide layer 216c. Therefore, the contact resistance can be reduced as compared with a case where the pixel electrode 206 and the drain 207 are directly connected to each other. As a result, the display quality can be improved.

Although the pixel region 206 is formed below the black matrix 216 in either case of the manufacturing methods shown in the right and the left regions of FIGS. 13 (a) to 13 (d), the present invention is not limited to this construction. An inverted structure may be employed.

Embodiment 6

Figure 14:
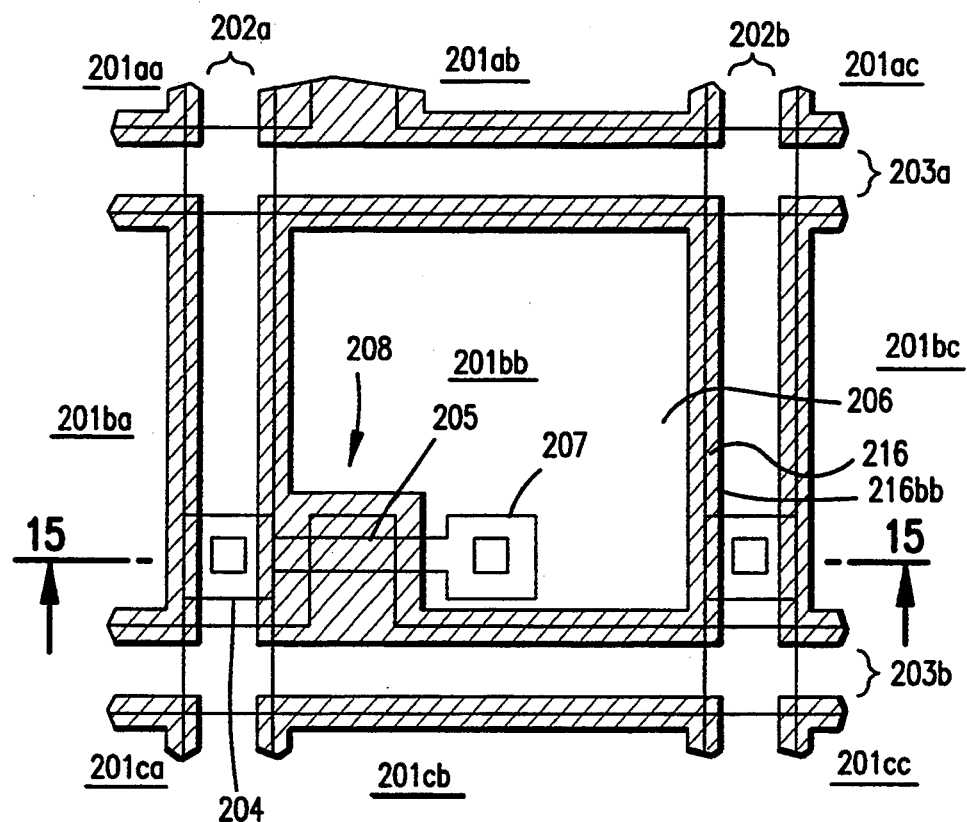
FIG. 14 is a plan view illustrating a portion of a matrix array of a liquid crystal display device according to Embodiment 6 of the present invention.
Figure 15:
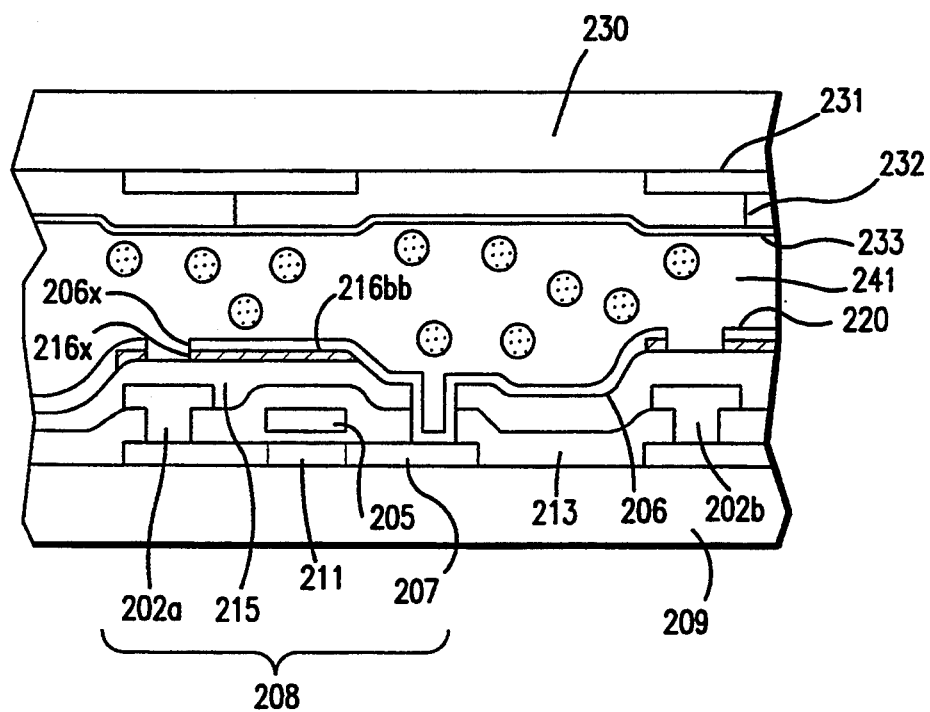
FIG. 15 is a cross sectional view taken along line 15—15 of FIG. 14.

FIG. 14 is a schematic plan view illustrating a portion of an active matrix substrate for use in a liquid crystal display device according to Embodiment 4 of the present invention. FIG. 15 is a cross sectional view taken along line 15—15 of FIG. 14.

The liquid crystal display device according to this embodiment has the basic structure similar to that of the liquid crystal display device according to Embodiment 4. There is a difference in only the type of liquid crystal to be enclosed between the active matrix and the opposing substrate. Hence, the same reference numerals are given to the corresponding elements and their detailed descriptions are omitted here.

Referring to the foregoing drawings, the liquid crystal display device according to this embodiment also includes the molybdenum silicide layer 216bb (a conductive and light shielding layer) having the light shielding characteristics and conductivity on the surface of the pixel electrode 206 in the pixel region 201. The molybdenum silicide layer 216bb is present in the boundary regions between the pixel region 201bb and the adjacent pixel regions 201ab, 201ba, 201bc and 201cb so that its outer end 216x coincides with the outer end 206x of the pixel electrode 206 above the data lines 202a, 202b, and the gate lines 203a, 203b.

The opposing substrate 230 is disposed to face the active matrix substrate constituted as described above. Furthermore, liquid crystal 241 is enclosed between the foregoing substrates. Since a polymer-dispersion-type liquid crystal is enclosed in the liquid crystal display device according to this embodiment, the orienting film is not formed on the surface of the active matrix substrate and the opposing substrate 230. The remaining structures are the same as those of the liquid crystal display device according to Embodiment 4.

Although the liquid crystal display device according to this embodiment is different in the type of liquid crystal from the liquid crystal display device according to Embodiment 4, each of the molybdenum silicide layers 216bb, 216ab, 216ba... is used as the black matrix 216. Therefore, the black matrix does not need to be provided adjacent to the opposing substrate 230, or the opposing-substrate-side black matrix 231 may be complementarily formed as shown in FIG. 15. As a result, the accuracy in the position alignment can be disregarded when the two transparent substrates are caused to face each other. Therefore, it is not necessary to provide a margin for the width of the black matrix 216 and the black matrix 231 adjacent to the opposing substrate. As a result, the aperture ratio of the liquid crystal display device can be raised, similar to the liquid crystal display device according to Embodiment 4.

Embodiment 7

Figure 16:
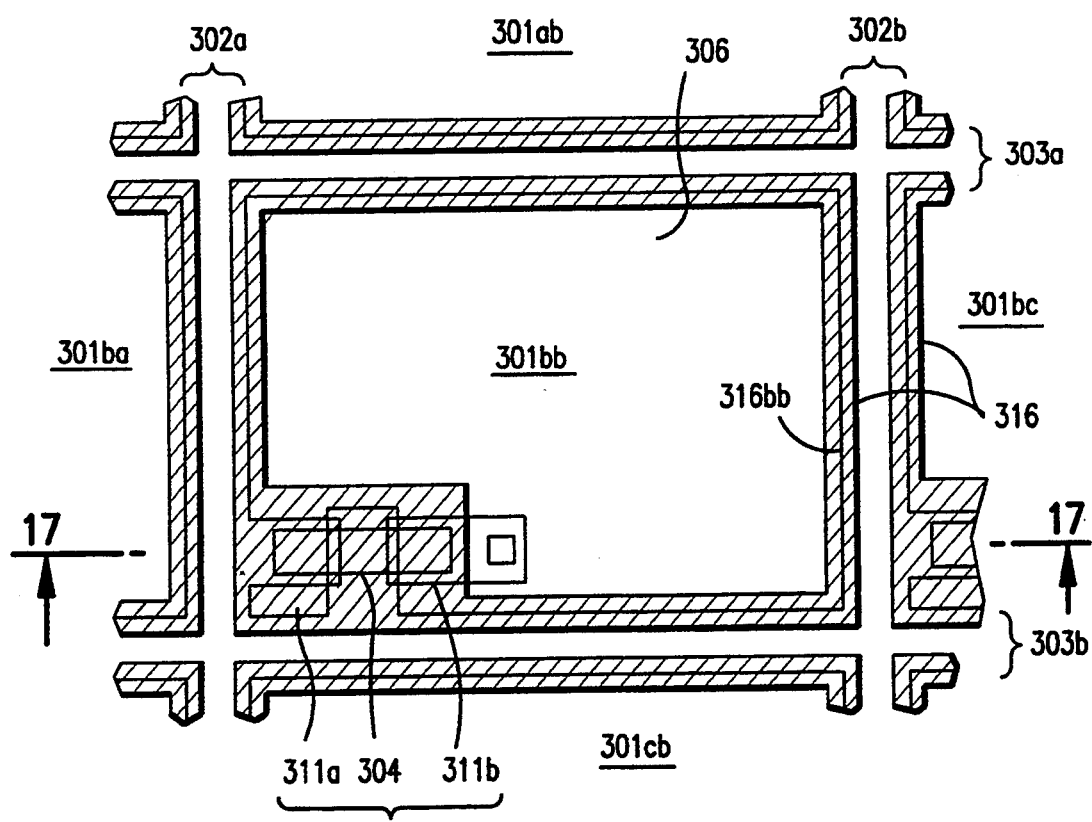
FIG. 16 is a plan view illustrating a portion of a matrix array of a liquid crystal display device according to Embodiment 7 of the present invention.
Figure 17:
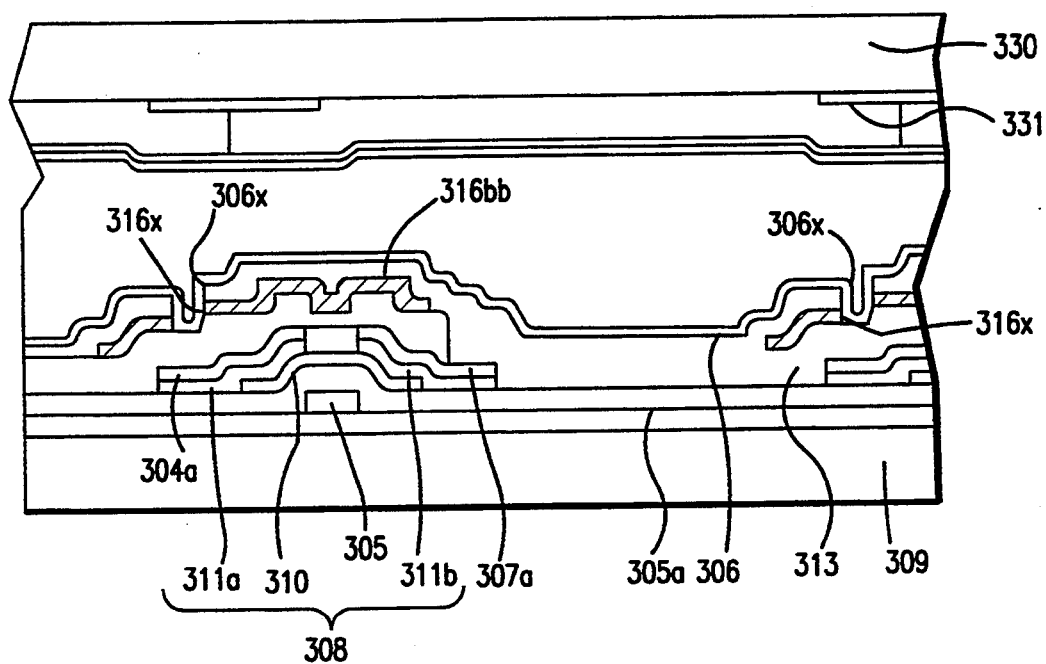
FIG. 17 is a cross sectional view taken along line 17—17 of FIG. 16.

FIG. 16 is a schematic plan view illustrating a portion of an active matrix substrate for use in a liquid crystal display device according to Embodiment 7 of the present invention. FIG. 17 is a cross sectional view taken along line 17—17 of FIG. 16.

In the liquid crystal display device according to this embodiment, a TFT 308 also is formed by a source 311a to which a data line 302a is electrically connected and a drain 311b to which a pixel electrode 306 is electrically connected in each pixel region, such as a pixel region 301bb (a first pixel region) which are formed by sectioning with vertical data lines 302a, 302b . . . (signal lines) and horizontal gate lines 303a, 303b . . . (scanning lines). Although the TFT 308 is arranged similar to the TFT of the liquid crystal display device according to Embodiment 1 in terms of function, the liquid crystal display device according to the present invention has an arrangement such that it is constituted by a so-called inverted stagger type TFT. That is, an insulating film is formed on the surface of a transparent substrate 309 supporting the overall body of the liquid crystal display device. Furthermore, a gate electrode 305 is formed on the surface of the insulating film. Furthermore, a gate electrode insulating film 305a, a non-doped amorphous silicon layer 310, and amorphous silicon layers (source 311a and drain 311b) to which n-type impurities are doped are formed on the surface of the aforesaid elements. In addition, a source electrode 304a and a drain electrode 307a are formed to correspond to the amorphous silicon layer (source 311a and drain 311b). The pixel electrode 306 is electrically connected to the drain electrode 307a via an interlayer insulating film 313.

The liquid crystal display device according to this embodiment has a molybdenum silicide layer 316bb (a conductive and light shielding layer) formed on the surface of the interlayer insulating film 313 and below the pixel electrode 306. The molybdenum silicide layer 316bb is formed in the boundary regions between the pixel region 301bb and adjacent pixel regions 301ab, 301ba, 301bc and 301cb so that its outer end 316x is positioned above the data lines 302a, 302b, and the gate lines 303a, 303b. Although the conductive and light shielding layers, such as the molybdenum silicide layer 316bb, are formed in all of the pixel regions, each molybdenum silicide layer is insulated and separated from the pixel electrode and the molybdenum silicide layers in the adjacent pixel regions. Since the remaining structures are the same as those of the liquid crystal display device according to Embodiment 4, corresponding elements are given the same reference numerals and their descriptions are omitted here.

Although the liquid crystal display device structured as described above is different from the liquid crystal display device according to Embodiment 4 due to the difference in the structure of the TFT 308, a similar principle of the display is employed. As a result, a similar effect to that obtainable from the liquid crystal display device according to Embodiment 4 can be attained. For example, the molybdenum silicide layers 316bb . . . formed in each of the pixel regions 301bb . . . are used as the black matrix 316, so that the black matrix does not need to be formed adjacent to an opposing substrate 330, or only a complementary element for shielding only light that passes through the data lines 302a, 302b and the gatelines 303a, 303b is required to be formed as an opposing-substrate-side black matrix 331 shown in FIG. 17. Therefore, it is not necessary to widen the width of the black matrix 316 or the opposing substrate side matrix 331 in order to improve the position alignment when the two transparent substrates are caused to face each other. Furthermore, each of the molybdenum silicide layers 316bb . . . are formed to reach the surface of the same transparent substrate in the pixel regions 301bb, . . . resulting in an excellent accuracy in terms of position. Accordingly, the width of the molybdenum silicide layers 316bb . . . can be set to a minimum width to correspond to the width of each of the data lines 302a, 302b, and the gate lines 303a, 303b. Therefore, the aperture ratio of the liquid crystal display device can be raised. In addition, the potential of the molybdenum silicide layer 316bb does not disorder the state of orientation of the liquid crystal, resulting in an excellent display quality. Furthermore, the outer surface range of the pixel electrode 306 and the outer surface range of the black matrix 316 can be made to coincide with each other. This covers any disorder of the orientation of the liquid crystal caused by the potential from the foregoing electrodes, with the black matrix 316.

Embodiment 8

Figure 18:
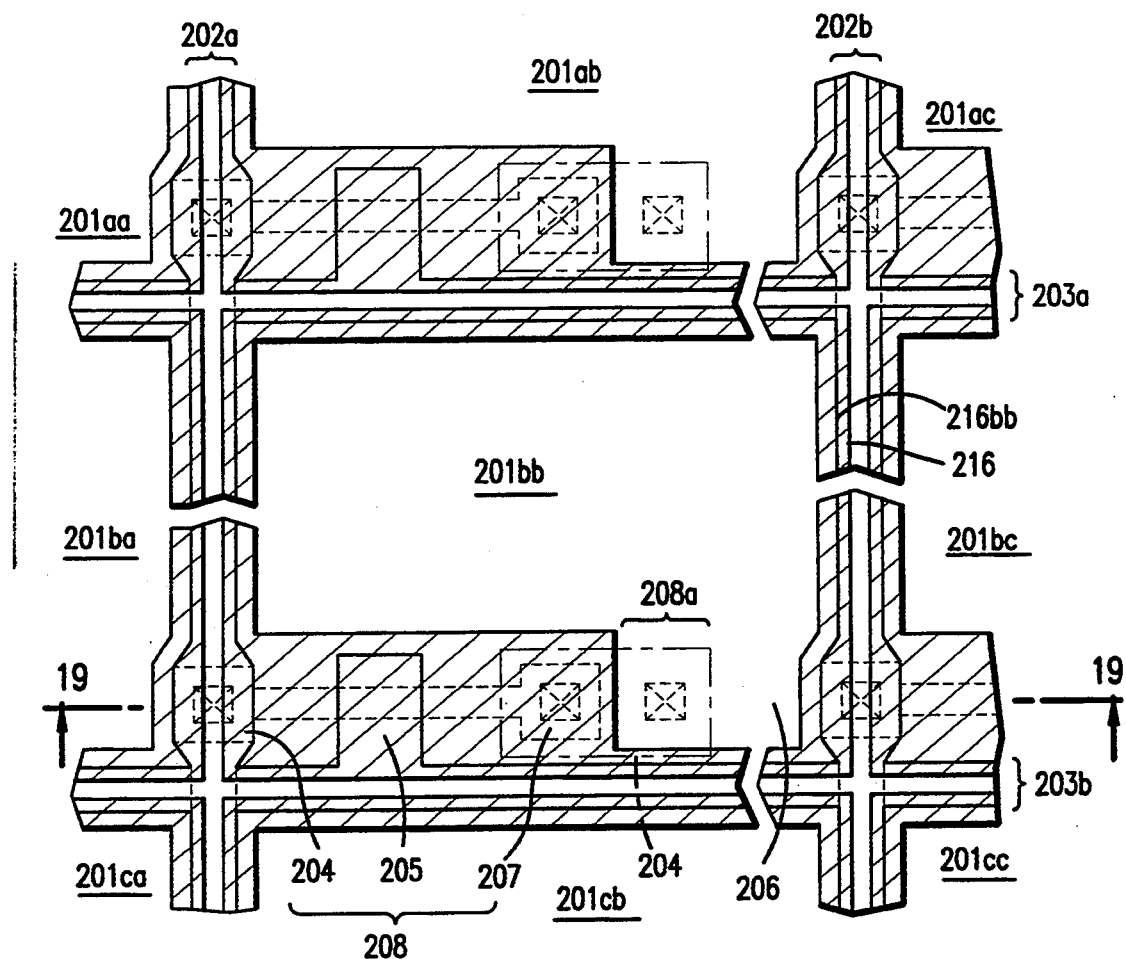
FIG. 18 is a plan view illustrating a portion of a matrix array of a liquid crystal display device according to Embodiment 8 of the present invention.
Figure 19:
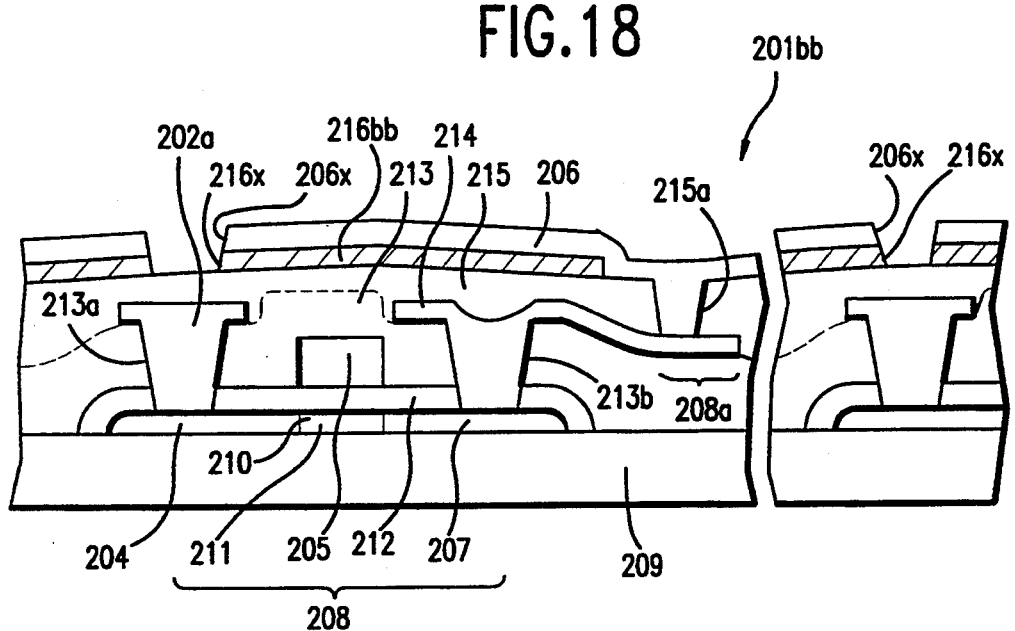
FIG. 19 is a cross sectional view taken along line 19—19 of FIG. 18.

FIG. 18 is a schematic plan view illustrating a portion of an active matrix substrate for use in a liquid crystal display device according to Embodiment 8 of the present invention. FIG. 19 is a cross sectional view taken along line 19—19 of FIG. 18. Elements having functions corresponding to those of the elements of the liquid crystal display device according to Embodiment 4 shown in FIGS. 8 and 9 are given the same reference numerals.

In the liquid crystal display device according to this embodiment, the TFT 208 also is, as shown in FIG. 18, formed in the pixel region 201bb (the first pixel region) by the source 204 to which the data line 202a is electrically connected, the gate electrode 205 to which the gate line 203b is electrically connected, and the drain 207 to which the pixel electrode 206 is electrically connected. The pixel electrode 206 is a transparent electrode made of ITO that is a conductive and light transmissible material, and is formed over the entire surface of the pixel region 201bb. The end portion of the pixel electrode 206 is extended to a position above the data lines 202a, 202b, and the gate lines 203a, 203b. Each of the pixel electrodes 206 has a wide overlapping area over the forward gate line 203a.

As for the cross sectional structure of the pixel region 201bb, an n-type impurity such as phosphorus is doped to the polycrystalline silicon layer 210 formed on the surface of the transparent substrate 209 supporting the overall body of the liquid crystal display device except for the channel region 211 so that the source 204 and the drain 207 are formed. A lower-layer-side interlayer insulating film 213 made of a silicon oxide film is deposited on the surface of the TFT 208. The first connection hole 213a and the second connection hole 213b are formed in the lower-layer-side interlayer insulating film 213. The data line 202a made of the aluminum layer is electrically connected to the source 204 via the first connection hole 213a.

A stacked electrode layer 214 made of ITO, which is a conductive and light transmissible material, similar to the pixel electrode 206, is electrically connected to the drain 207 via the second connection hole 213b. The surface of the lower-layer-side interlayer insulating film 213 has projections and pits corresponding to the shape of the TFT 208. The stacked electrode 214 is formed to extend onto a flat region 208a (on a region in which the TFT 208 is not formed) in which the TFT 208 is not formed. Therefore, the surface of the stacked electrode 214 is flat in this region 208a.

In the liquid crystal display device, the upper-layer-side interlayer insulating film 215 made of a silicon oxide film is formed on the surface of the transparent substrate 209. The pixel electrode 206 is formed on the surface of the upper-layer-side interlayer insulating film 215. The pixel electrode 206 is electrically connected to the stacked electrode layer 214 via the connection hole 215a of the upper-layer-side interlayer insulating film 215. The connection hole 215a is formed on the flat region 208a in which the TFT 208 is not formed. As a result, the pixel electrode 206 is electrically connected to the flat region of the stacked electrode layer 214. Incidentally, a polyimide layer or the like may be employed as the upper-layer-side interlayer insulating film 215 to flatten its surface for the purpose of further improving the orienting characteristics of the liquid crystal.

This embodiment has an arrangement in which the liquid crystal is enclosed between the transparent substrate 209 on which the matrix array is formed and the other side transparent substrate (omitted from illustration) on which a color filter and a common electrode are formed so that a liquid crystal display device is formed. In response to a signal transmitted through the data lines 202a, 202b . . . and the gate lines 203a, 203b . . . the potential generated between the common electrode and each pixel electrode 206 is controlled to change the state of orientation of the liquid crystal in each pixel region, causing information to be displayed. The potential is applied to the pixel electrode 206 via the drain 207 and the stacked electrode layer 214 of the TFT 208.

In the liquid crystal display device according to this embodiment, the molybdenum silicide layer 216bb (the conductive and light shielding layer) having light shielding characteristics and conductivity is formed on the surface of the upper-layer-side interlayer insulating film 215 and below the pixel electrode 206. The molybdenum silicide layer 216bb is formed so that its outer end 216x is positioned above the data lines 202a, 202b and the gate lines 203a, 203b in the boundary regions between the pixel region 201bb and adjacent pixel regions 201ab, 201ba, 201bc and 201cb. Furthermore, the outer end 216x coincides with the outer end 206x. The conductive and light shielding layer, such as the molybdenum silicide layer, is similarly formed in each pixel region. The molybdenum silicide layer 216bb is insulated and separated from the outer ends 216x of each of the molybdenum silicide layers 216ab, 216ba, 216cb and 216bc in the adjacent pixel regions 201ab, 201ba, 201cb and 201bc at positions above the data lines 202a, 202b and the gate lines 203a, 203b.

In the liquid crystal display device constructed as described above, each of the molybdenum silicide layers 216bb . . . is used as the black matrix. Therefore, when the active matrix substrate formed adjacent to the transparent substrate 209 and the opposing substrate 230 are allowed to face each other as shown in FIG. 12, the molybdenum silicide layer 216bb serves as a margin at the time of the position aligning of the black matrix 231 on the opposing substrate. As a result, the position aligning accuracy can be disregarded. Furthermore, the potential of the molybdenum silicide layer 216bb is in a state where it has the same potential as is applied to the pixel electrode 206, resulting in that the state of orientation of the liquid crystal is not disordered. As a result, excellent display quality can be obtained. In addition, the black matrix 216 is formed by the molybdenum silicide layers 216bb . . . which are electrically independent in each pixel. Therefore, even if the molybdenum silicide layer 216bb and the data line 202a are in a short circuit state in the pixel region 201bb, only a point defect in only this pixel region 201bb takes place. As a result, the reliability of the liquid crystal display device is excellent.

In the liquid crystal display device according to this example, the data line 202a is formed on the lower-layer-side interlayer insulating film 213 and is electrically connected to the source 204 of a thin film transistor 208 via the first connection hole 213a. On the other hand, the pixel electrode 206 is formed on the upper-layer-side interlayer insulating film 215 while being stacked on the stacked electrode layer 214, which serves as a pad. That is, the data line 202a and the pixel electrode 206 are formed on different layers, resulting in the risk of short circuit being overcome. Therefore, the end portion 206x of the pixel electrode 206 can be disposed at a position above the data line 202a, resulting in that the portion adjacent to the data line 202a can be used as a display portion. As a result, the aperture ratio of the pixel region 201bb is high.

Furthermore, the pixel electrode 206 exhibits a shielding effect of shielding the data line 202a, resulting in that the potential of the data line 202a does not disorder the orientation of the liquid crystal. Therefore, the display quality can be improved. Moreover, since the stacked electrode layer 214 has conductivity, no problem takes place in forming a matrix array. Furthermore, the stacked electrode layer 214 made of ITO is different from a case where a metal layer is used as the stacked electrode layer because it has light transmissivity. Therefore, even if the stacked electrode layer 214 is extended so that the pixel region 206 can be easily electrically connected to it, the aperture ratio of the pixel region 201bb is not sacrificed. In addition, since the pixel electrode 206 is in a state where it is stacked while interposing the stacked electrode 214, the connection holes 213b and 215a in the lower and upper-layer-side interlayer insulating films 213 and 215 are structured to have a low aspect ratio. Therefore, the electrical connection portions in the connection holes 213b and 215a exhibit excellent reliability.

Furthermore, this embodiment has an arrangement in which ITO is employed to form the stacked electrode 214 similarly to the pixel electrode 206. Therefore, a low connection resistance is exhibited between the stacked electrode layer 214 and the pixel electrode 206. As a result, a low resistance level can be maintained between the drain 207 and the pixel electrode 206. Furthermore, the surfaces of the stacked electrode layer 214 and the upper-layer-side interlayer insulating film 215 have projections and pits corresponding to the shape of the TFT 208. However, the connection hole 215a in the upper-layer-side interlayer insulating film 215 is formed in a flat region 208a in which the TFT 208 is not formed. Therefore, excellent reliability can be attained in the contact between the stacked electrode layer 214 and the pixel electrode 206 while having a low contact resistance. Furthermore, the connection structure of the aforesaid type exhibits an effect of raising the flat portion and flattening the surface of the pixel electrode 206 to improve the state of the orientation of the liquid crystal.

The pixel region 201bb is formed precisely, corresponding with the tendency of precisely forming liquid crystal display devices. Therefore, the display capacitance in the pixel region 201*bb* is reduced. Even if a TFT 208 having a large OFF-resistance is used to reduce the leakage current, the display voltage is lowered during a period in which the gate line 203*b* is not selected. Therefore, there is a tendency that the display holding characteristics deteriorate. However, in the liquid crystal display device according to this embodiment, the end portion of the pixel electrode 206 is positioned above the forward gate line 203*a* to form a charge storage capacity between them. As a result, a fact that the forward gate line 203*a* is in a non-selected period in a period in which the pixel region 201*bb* is selected, and the reference potential is applied to the gate line 203*a*, may be utilized to store a charge in the charge storage capacitance and improve the characteristics of holding the voltage applied to the liquid crystal. Furthermore, this embodiment has an arrangement in which the pixel electrode 206 is formed to have a large overlapping area on the forward gate line 203*a*. Therefore, a significant improvement of the holding characteristics can be obtained.

Embodiment 9

Figure 20:
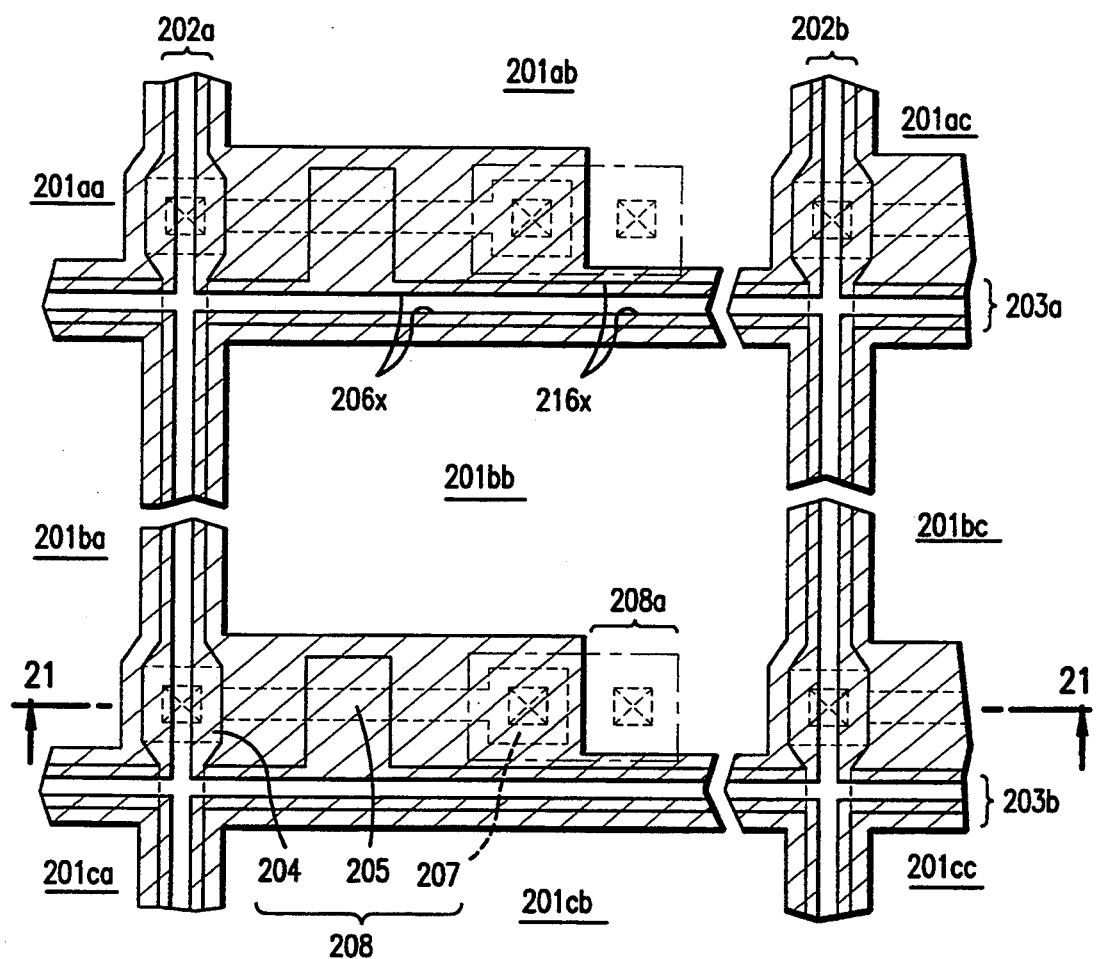
FIG. 20 is a plan view illustrating a portion of a matrix array of a liquid crystal display device according to Embodiment 9 of the present invention.
Figure 21:
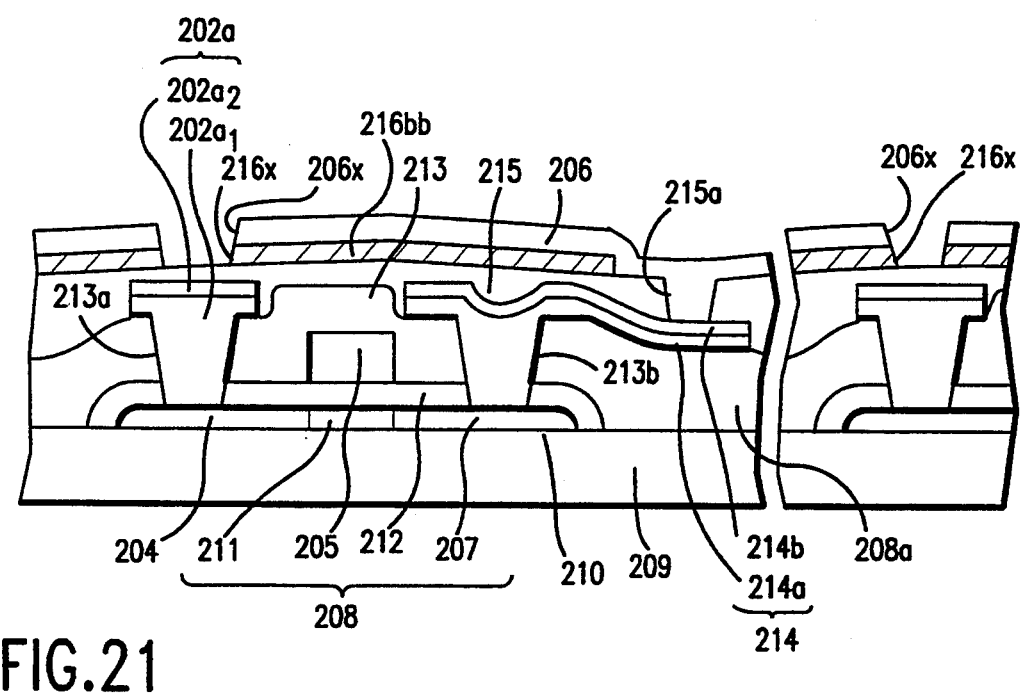
FIG. 21 is a cross sectional view taken along line 21—21 of FIG. 20.

FIG. 20 is a schematic plan view illustrating a portion of an active matrix substrate for use in a liquid crystal display device according to Embodiment 9 of the present invention. FIG. 21 is a cross sectional view taken along line 21—21 of FIG. 20. Elements having functions corresponding to those of elements of the liquid crystal display device according to Embodiment 4 shown in FIGS. 8 and 9 and the liquid crystal display device according to Embodiment 8 shown in FIGS. 18 and 19 are given the same reference numerals and their detailed descriptions are omitted.

Referring to the foregoing drawings, in the pixel region 201*bb*, the TFT 208 is formed by the source 204 to which the data line 202*a* is electrically connected, the gate electrode 205 to which the gate line 203*b* is electrically connected, and the drain 207 to which the pixel electrode 206 is electrically connected. The pixel electrode 206 is a transparent electrode made of ITO that is a conductive and light transmissible material, and is formed to cover substantially the entire surface of the pixel region 201*bb*. The end portion of the pixel electrode 206 is extended to positions above the data lines 202*a*, 202*b*, and the gate lines 203*a*, 203*b*. Each pixel electrode 206 has a wide overlapping area on the forward gate line 203*a*.

As for the cross sectional structure of the pixel region 201*bb*, the source 204 and the drain 207 are formed in the polycrystalline silicon layer 210 formed on the surface of the transparent substrate 209 except for the channel region 211. On the surface of the TFT 208, the lower-layer-side interlayer insulating film 213 made of a silicon oxide film is deposited, and has the first connection hole 213*a* and the second connection hole 213*b* formed therein. The data line 202*a* made of an aluminum layer is electrically connected to the source 204 via the first connection hole 213*a*.

On the other hand, the stacked electrode layer 214 is electrically connected to the drain 207 via the second connection hole 213*b*. Although the surface of the lower-layer-side interlayer insulating film 213 has projections and pits corresponding to the shape of the TFT 208, the stacked electrode layer 214 is formed to extend to a position above the flat region 208*a* (on the region in which the TFT 208 is not formed) in which the TFT 208 is not formed. Therefore, the surface of the stacked electrode layer 214 formed on the region 208*a* is flattened. Furthermore, the upper-layer-side interlayer insulating film 215 made of a silicon oxide film is formed on the surface of the transparent substrate 209. In addition, the pixel electrode 206 is formed on the surface of the upper-layer-side interlayer insulating film 215. The pixel electrode 206 is electrically connected to the stacked electrode layer 214 via the connection hole 215*a* of the upper-layer-side interlayer insulating film 215. The connection hole 215*a* is formed on the flat region 208*a* in which the TFT is not formed. Therefore, the pixel electrode 206 is electrically connected to the flat region of the stacked electrode layer 214.

In the liquid display device according to this embodiment, the data line 202*a* has a redundant wiring structure formed by a lower side first data line 202*a*$_1$ formed by an aluminum layer and an upper second data line 202*a*$_2$ formed by a molybdenum silicide layer. The stacked electrode layer 214 also is constituted by a lower first stacked electrode layer 214*a* made of an aluminum layer and an upper second stacked electrode layer 214*b* made of a molybdenum silicide layer. Furthermore, the source layer 202*a* and the stacked electrode layer 214 are formed in the same layer, the first data line 202*a*$_1$ and the first stacked electrode layer are formed simultaneously, and the second data line 202*a*$_2$ and the second stacked electrode layer 214*b* are simultaneously formed. The material for forming the second data line 202*a*$_2$ and the second stacked electrode layer 214*b* must be a material which cannot be dissolved by the etchant used in patterning the pixel electrode 206 and which is exemplified by, as well as molybdenum silicide, titanium silicide, tungsten silicide, tantalum silicide, titanium, tungsten, tantalum, and titanium nitride.

In the liquid crystal display device according to this embodiment, the molybdenum silicide layer 216*bb* (the conductive and light shielding layer) having light shielding characteristics and conductivity is formed on the surface of the upper-layer-side interlayer insulating film 215 and below the pixel electrode 206. The molybdenum silicide layer 216*bb* is formed so that its outer end 216*x* is positioned above the data lines 202*a*, 202*b*, and the gate lines 203*a*, 203*b* in the boundary regions between the pixel region 201*bb* and adjacent pixel regions 201*ab*, 201*ba*, 201*bc* and 201*cb*, the outer end 216*x* being made to coincide with the outer end 206*x* of the pixel electrode 206. Although the conductive and light shielding layer, such as the molybdenum silicide layer 216*bb* is formed in each pixel region, the molybdenum silicide layer 216*bb* is insulated and separated from the outer end 216*x* of each of the molybdenum silicide layers 216*ab*, 216*ba*, 216*cb* and 216*bc* in the adjacent pixel regions 201*ab*, 201*ba*, 201*cb* and 201*bc* at positions above the data lines 202*a*, 202*b*, and the gate lines 203*a*, 203*b*.

In the liquid crystal display device according to this embodiment as described above, each of the molybdenum silicide layers 216*bb* . . . is used as the black matrix. Therefore, position alignment accuracy can be disregarded when the active matrix substrate and the opposing substrate are allowed to face each other. Furthermore, since the potential of the molybdenum layer 216*bb* is in a state where the same potential is applied to it as is applied to the pixel electrode 206, the state of orientation of the liquid crystal is not disordered. Therefore, excellent display quality can be obtained. Furthermore, the black matrix 216 is formed by the molybdenum silicide layers 216*bb* . . . that are electrically independent in each pixel. Therefore, even if the molybdenum silicide layer 216*bb* and the data line 202*a* are in a short circuit state, only a point defect in the display in only the foregoing pixel region 201*bb* takes place. As a result, the reliability of the liquid crystal display device is excellent.

Since the data line 202*a* of the liquid crystal display device according to this example is formed into a redundant structure, excellent reliability can be obtained. Furthermore, the stacked electrode 214 also is formed by the first stacked electrode layer 214*a* formed by the aluminum layer and the second stacked electrode layer 214*b* formed by the molybdenum silicide layer. In addition, the pixel electrode 206 made of the ITO layer is electrically connected to the first stacked electrode layer 214*a* made of the aluminum layer via the second stacked electrode layer 214*b* made of the molybdenum silicide layer. As a result, the molybdenum silicide layer acts as a contact layer between the ITO layer and the aluminum layer, resulting in a reduction in the contact resistance between them. Furthermore, since the molybdenum silicide forms the upper second stacked electrode layer 214*b*, the stacked electrode layer 214 is not damaged by the etchant when the pixel electrode 206 is formed by etching.

Furthermore, the data line 202*a* and the pixel electrode 206 are formed on different layers, eliminating the risk of short circuit. Therefore, the end portion 206*x* of the pixel electrode 206 can be disposed to reach a position above the data line 202*a*. As a result, a maximum aperture ratio can be maintained. Furthermore, since the pixel electrode 206 exhibits an effect of shielding the data line 202*a*, the potential of the data line 202*a* does not disorder the orientation of the liquid crystal. Therefore, the display quality can be improved.

Since the pixel electrode 206 is in a state in which it is stacked while interposing the stacked electrode layer 214, the connection holes 213*b* and 215*a* of the lower-layer-side and the upper-layer-side interlayer insulating films 213 and 215 are both formed into structures having a low aspect ratio. Therefore, the electrically connected portions in the connection holes 213*b* and 215*a* exhibit excellent reliability. Furthermore, the surfaces of the stacked electrode layer 214 and the upper-layer-side interlayer insulating film 215 have projections and pits corresponding to the shape of the TFT 208. However, the connection hole 215*a* of the upper-layer-side interlayer insulating film 215 is formed on the flat region 208*a* in which the TFT 208 is not formed. Therefore, excellent reliability is attained in the contact between the stacked electrode layer 214 and the pixel electrode 206, and a low contact resistance is exhibited. Furthermore, the connection structure thus arranged improves the state of orientation of the liquid crystal because the flat portion is raised and the surface of the pixel electrode 206 is flattened.

Furthermore, the liquid crystal display device according to this example has an arrangement in which the end portion of the pixel electrode is positioned above the gate line 203*a*, and the pixel electrode 206 has a wide overlapping area on the forward gate electrode 203*a*. Therefore, a significant improvement of the holding characteristics can be obtained.

Embodiment 10

Figure 22:
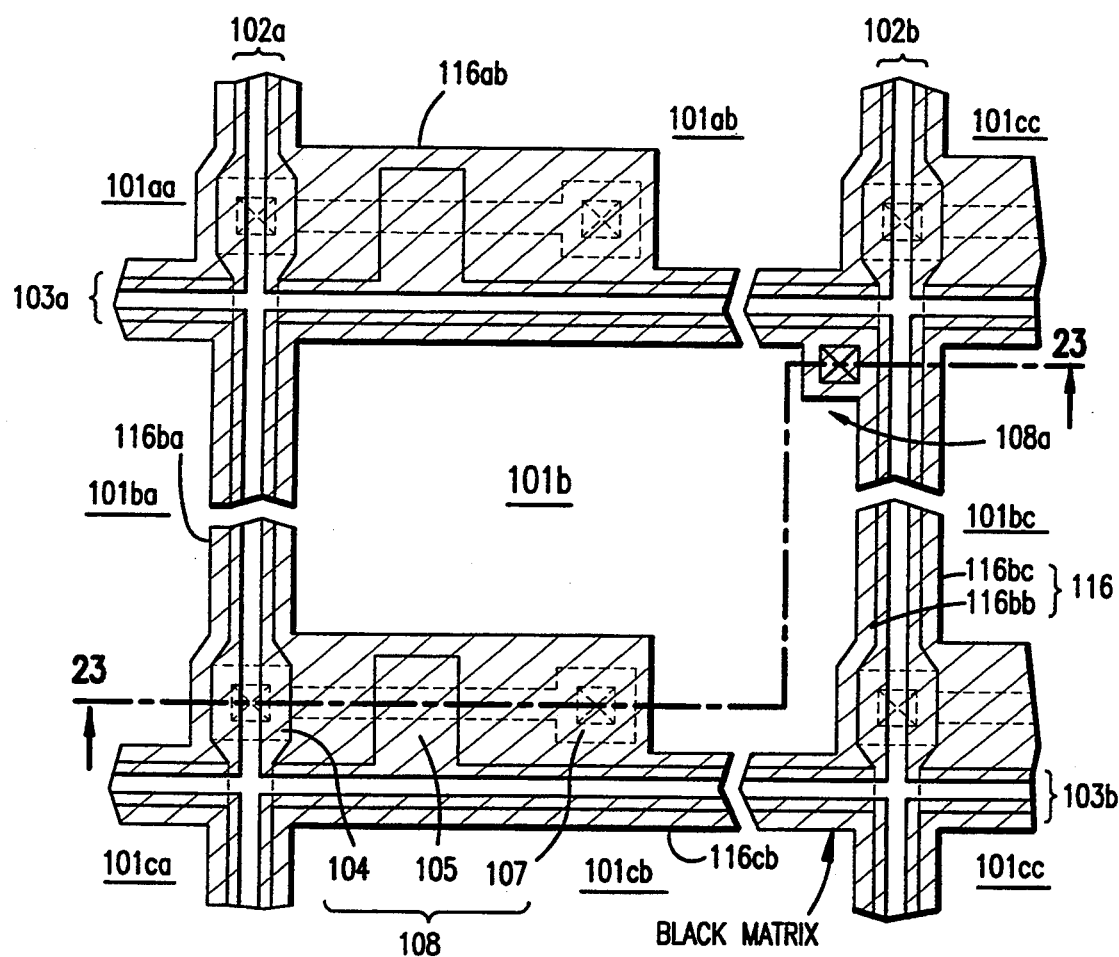
FIG. 22 is a plan view illustrating a portion of a matrix array of a liquid crystal display device according to Embodiment 10 of the present invention.
Figure 23:
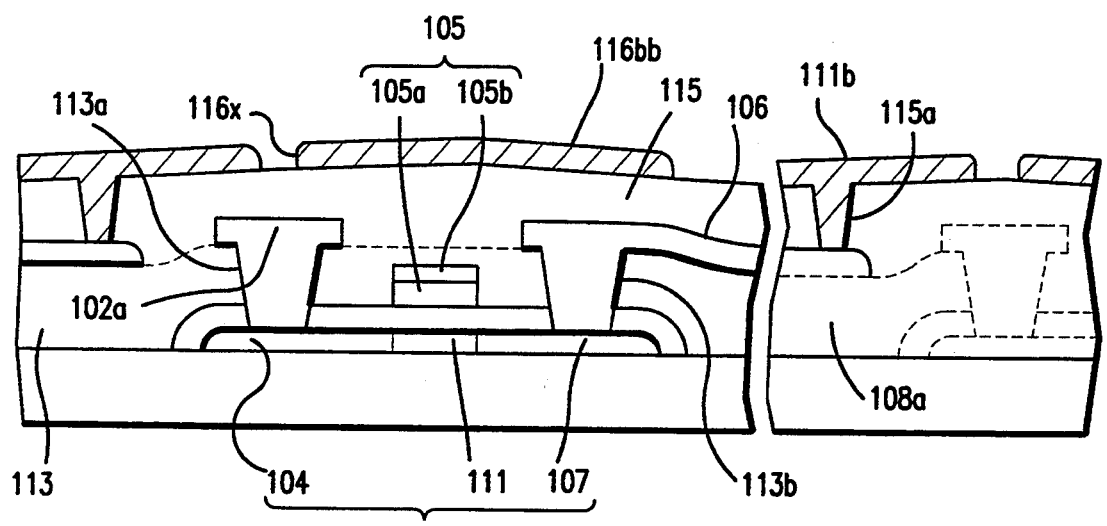
FIG. 23 is a cross sectional view taken along line 23—23 of FIG. 22.

FIG. 22 is a schematic plan view illustrating a portion of an active matrix substrate for use in the liquid crystal display device according to Embodiment 10 of the present invention. FIG. 23 is a cross sectional view taken along line 23—23 of FIG. 22. Elements having functions corresponding to those of the elements of the liquid crystal display device according to Embodiment 1 shown in FIGS. 1 and 2 are given the same reference numerals and their detailed descriptions are omitted here.

In the liquid crystal display device according to this embodiment, the vertical data lines 102*a*, 102*b* . . . (the signal lines) and the horizontal gate lines 103*a*, 103*b* also are disposed to form a lattice. Furthermore, each of the pixel regions 101*aa*, 101*ab*, 101*ac*, 101*ba*, 101*bb* . . . are formed by sectioning between them so that a matrix array is defined. In the pixel region 101*bb*, the TFT 108 is formed by the source 104 to which the data line 102*a* is electrically connected, the gate electrode 105 to which the gate line 103*b* is electrically connected, and the drain 107 to which the pixel electrode 106 is electrically connected. The pixel electrode 106 is a transparent electrode made of ITO that is a conductive and light transmissible material, and is formed to cover substantially the entire surface of the pixel region 101*bb*. On the surface of the TFT 108, the lower-layer-side interlayer insulating film 113 made of a silicon oxide film is deposited. The lower-layer-side interlayer insulating film 113 has the first connection hole 113*a* and the second connection hole 113*b* therein. The data line 102*a* made of an aluminum layer is electrically connected to the source 104 via the first connection hole 113*a*. The pixel electrode 106 is electrically connected to the drain 107 via the second connection hole 113*b*. Furthermore, the upper-layer-side interlayer insulating film 115 made of a silicon oxide film is formed on the surface of the transparent substrate 109. The molybdenum silicide layer 116*bb* is formed on the surface of the upper-layer-side interlayer insulating film 115. The molybdenum silicide layer 116*bb* is electrically connected to the pixel electrode 106 via the connection hole 115*a* of the upper-layer-side interlayer insulating film 115. The connection hole 115*a* is formed in the flat region 108*a* in which the TFT 108 is not formed, at a position diagonal to the position at which the TFT 108 is formed in the pixel region 101*bb*. Therefore, the molybdenum silicide layer 116*bb* is electrically connected to the flat region of the pixel electrode 106.

The liquid crystal display device according to this embodiment is formed into a double layer structure comprised of a lower-layer side gate electrode 105*a* manufactured by dispersing phosphorus in an amount of $1 \times 10^{20}/CM^3$ in a polycrystalline silicon layer and having a thickness of 1500 Å or less, and an upper-layer-side gate electrode layer 105 made of a molybdenum silicide layer having a thickness of 2000 Å or less. The foregoing double layer structure is formed by first forming a polycrystalline silicon film to have a thickness of 1000 Å, and by using phosphorus oxychloride in an atmosphere of oxygen and nitrogen followed by dispersion at a temperature of 850° C. to form the lower-layer-side gate electrode layer 105*a*. Then, a 2000 Å molybdenum silicide layer is formed by sputtering to stack an upper-layer-side gate electrode layer 105*b*, followed by dry etching performed using $CF_4$-$O_2$ gas. Assuming that the composition of the molybdenum silicide is $MoSi_{x,,,}$ it is preferable that the value of x is set to a value from 2.0 to 3.5. If the value is larger than the foregoing range, the resistance value becomes too large. In order to prevent generation of cracks, it is suitable that the value is in a neighborhood of 2.5. In place of the molybdenum silicide, tungsten silicide or titanium silicide may be employed.

In the liquid crystal display device according to this embodiment as described above, each of the molybdenum silicide layers 116bb . . . is utilized as the black matrix 116. Therefore, when the active matrix substrate formed adjacent to the transparent substrate 109 and the opposing substrate are allowed to face each other, the molybdenum silicide layer 116bb serves as a margin in the position aligning with the black matrix adjacent to the opposing substrate. Therefore, the accuracy in the position alignment can be disregarded. Since the potential of the molybdenum silicide layer 116bb is in a state in which it is applied with the same potential applied to the pixel electrode 106, the state of orientation of the liquid crystal cannot be disordered. As a result, excellent display quality can be obtained. Furthermore, the black matrix 116 is in an independent state in each pixel, resulting in that, even if the molybdenum silicide layer 116bb and the data line 102a are in a short circuit state in the pixel region 101bb, only a point defect takes place in the display.

The liquid crystal display device according to this embodiment has the gate electrode 105 employing a polycide structure comprised of the lower-layer-side gate electrode layer 105a obtained by dispersing phosphorus in the polycrystalline silicon layer and having a thickness of 1500 Å or less and the upper-layer-side gate electrode layer 105a made of a molybdenum silicide layer having a thickness of 2000 Å or less. However, the film thickness of it and the quantity of the introduced impurity are optimized to prevent generation of cracks. Therefore, the resistance of the gate electrode 105 and the gate lines 103a and 103b can be lowered. Furthermore, generation of cracks in the lower-layer-side interlayer insulating film 113 and the upper-layer-side interlayer insulating film 115 can be prevented.

In this embodiment, the surface of the upper-layer-side interlayer insulating film 115 has projections and pits corresponding to the shape of the TFT 108. However, the connection hole 115a of the upper-layer-side interlayer insulating film 115 is, as the flat region 108a in which the TFT 108 is not formed, formed at a diagonal position with respect to the position at which the TFT 108 is formed in the pixel region 101bb. Therefore, reliability of the contact between the molybdenum silicide layer 116bb and the pixel electrode 106 is excellent.

Embodiment 11

Figure 24:
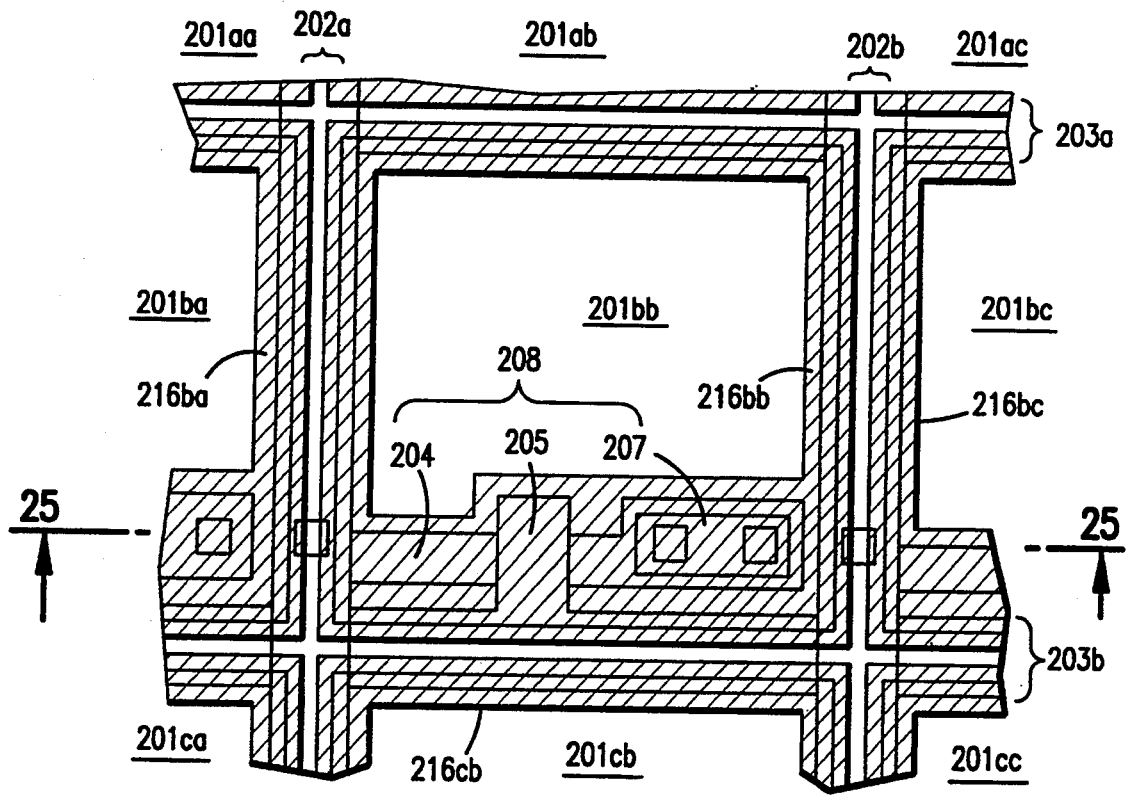
FIG. 24 is a plan view illustrating a portion of a matrix array of a liquid crystal display device according to Embodiment 11 of the present invention.
Figure 25:
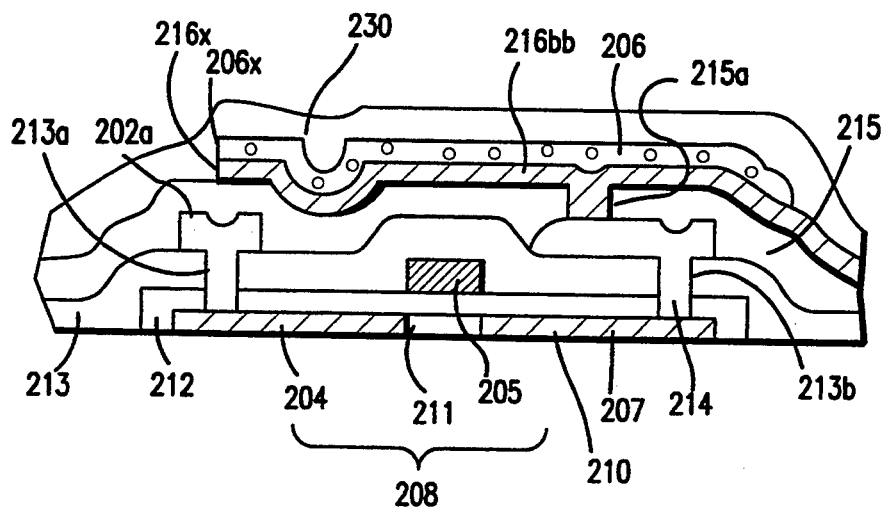
FIG. 25 is a cross sectional view taken along line 25—25 of FIG. 24.

FIG. 24 is a schematic plan view illustrating a portion of an active matrix substrate for use in the liquid crystal display device according to Embodiment 11 of the present invention. FIG. 25 is a cross sectional view taken along line 25—25 of FIG. 24. Elements having functions corresponding to those of the elements of the liquid crystal display device according to Embodiment 8 shown in FIGS. 18 and 19 are given the same reference numerals and their detailed descriptions are omitted here.

In the liquid crystal display device according to this embodiment, phosphorus also is, as an n-type impurity, introduced into the polycrystalline silicon layer 210 formed on the surface of the transparent substrate 209 in the pixel region 201bb except for the channel region 211. As a result, the source 204 and the drain 207 are formed. On the surface of the TFT 208, the lower-layer-side interlayer insulating film 213 made of a silicon oxide film is deposited. The lower-layer-side interlayer insulating film 213 has the first connection hole 213a and the second connection hole 213b therein. The data line 202a is electrically connected to the source 204 via the first connection hole 213a.

The stacked electrode layer 214 made of a chrome layer is, as a metal wiring layer having oxide resistance, electrically connected to the drain 207 via the second connection hole 213b. The relationship between the position at which the connection hole 213b is formed and the position at which the connection hole 215a is formed is so made that the connection hole 215a is positioned between the connection hole 213b and the gate electrode 205.

In the liquid crystal display device according to this embodiment, the molybdenum silicide layer 216bb (the conductive and light shielding layer) having light shielding characteristics and conductivity is formed on the surface of the upper-layer-side interlayer insulating film 215 and below the pixel electrode 206. The molybdenum silicide layer 216bb is formed so that its outline 216x is positioned above the data lines 202a, 202b and the gate lines 203a, 203b in the boundary regions between the pixel region 201bb and adjacent pixel regions 201ab, 201ba, 201bc and 201cb, while being made to coincide with the outline 206x of the pixel electrode 206.

Although the conductive and light shielding layer, such as the molybdenum silicide layer 216bb, is similarly formed in each pixel region, the molybdenum silicide layer 216bb is insulated and separated from the outer end 216x of each of the molybdenum silicide layers 216ab, 216ba, 216cb and 216bc in the adjacent pixel regions 201ab, 201ba, 201cb and 201bc at positions above the data lines 202a, 202b, and the gate lines 203a, 203b.

Figure 26:
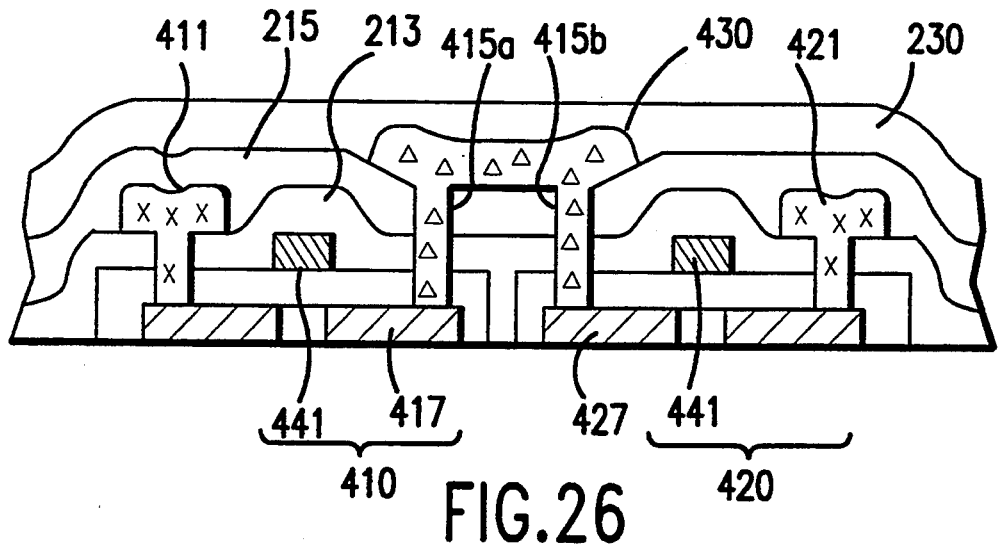
FIG. 26 is a cross sectional view illustrating a portion of the structure of a drive circuit formed on the same substrate for the matrix array of the liquid crystal display device according to Embodiment 11 of the present invention.
Figure 27:
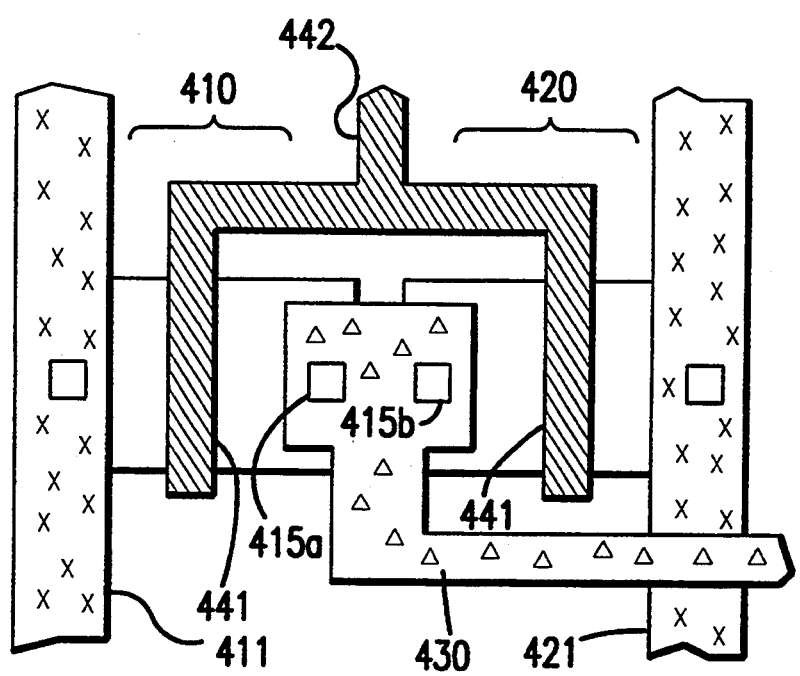
FIG. 27 is a plan view illustrating a portion of the structure of a drive circuit formed on the same substrate for the matrix array of the liquid crystal display device according to Embodiment 11 of the present invention.
Figure 28:
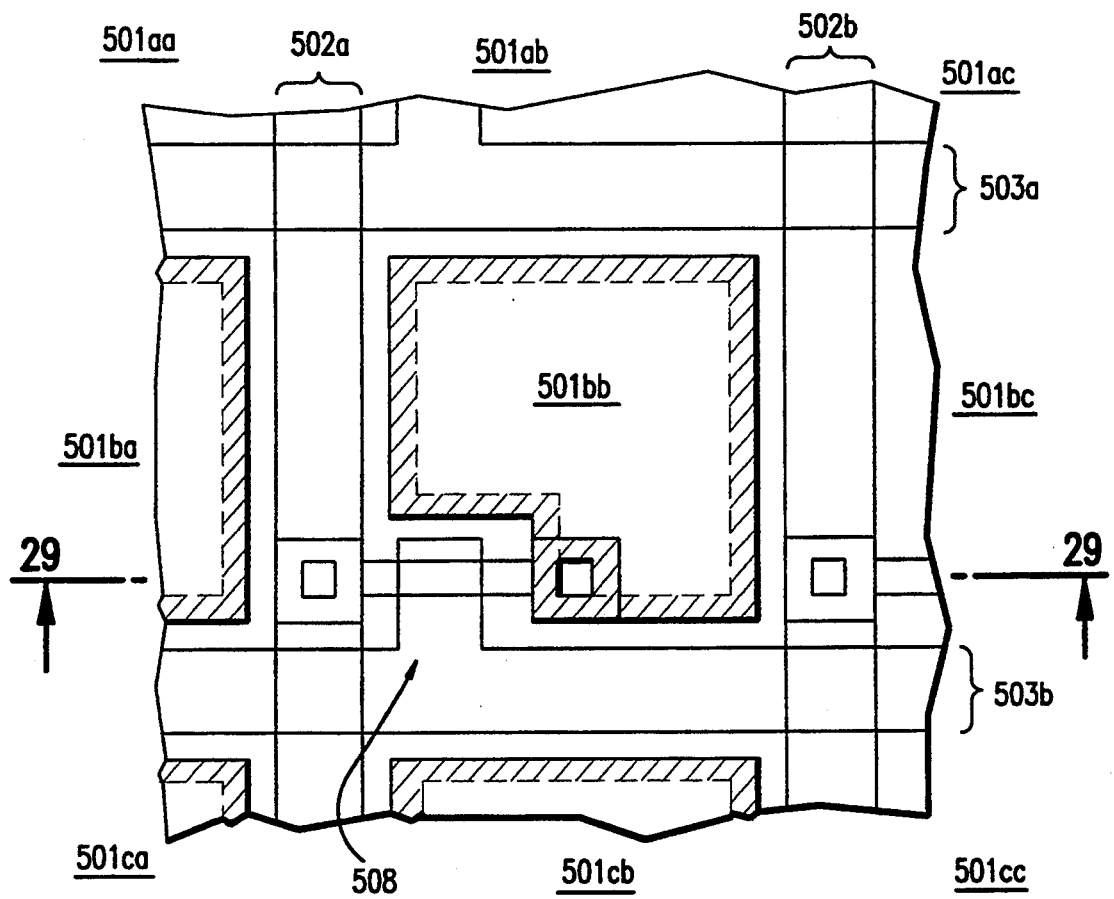
FIG. 28 is a plan view illustrating a portion of a matrix array of a conventional liquid crystal display device.
Figure 29:
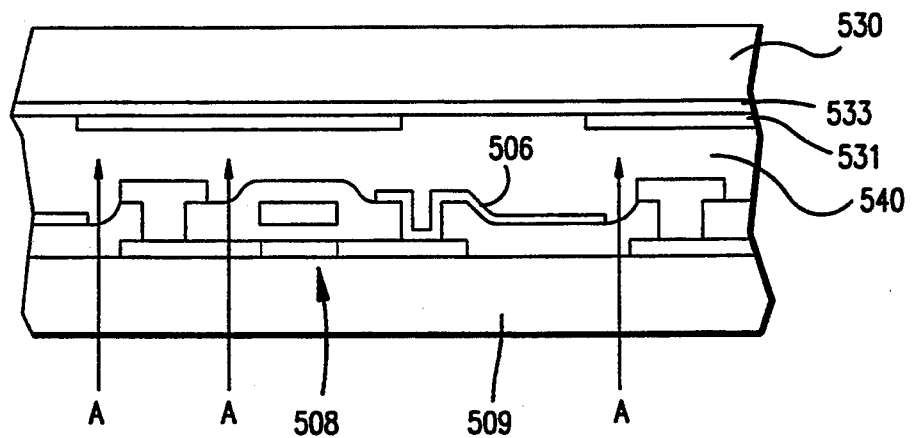
FIG. 29 is a cross sectional view taken along line 29—29 of FIG. 28.
Figure 30:
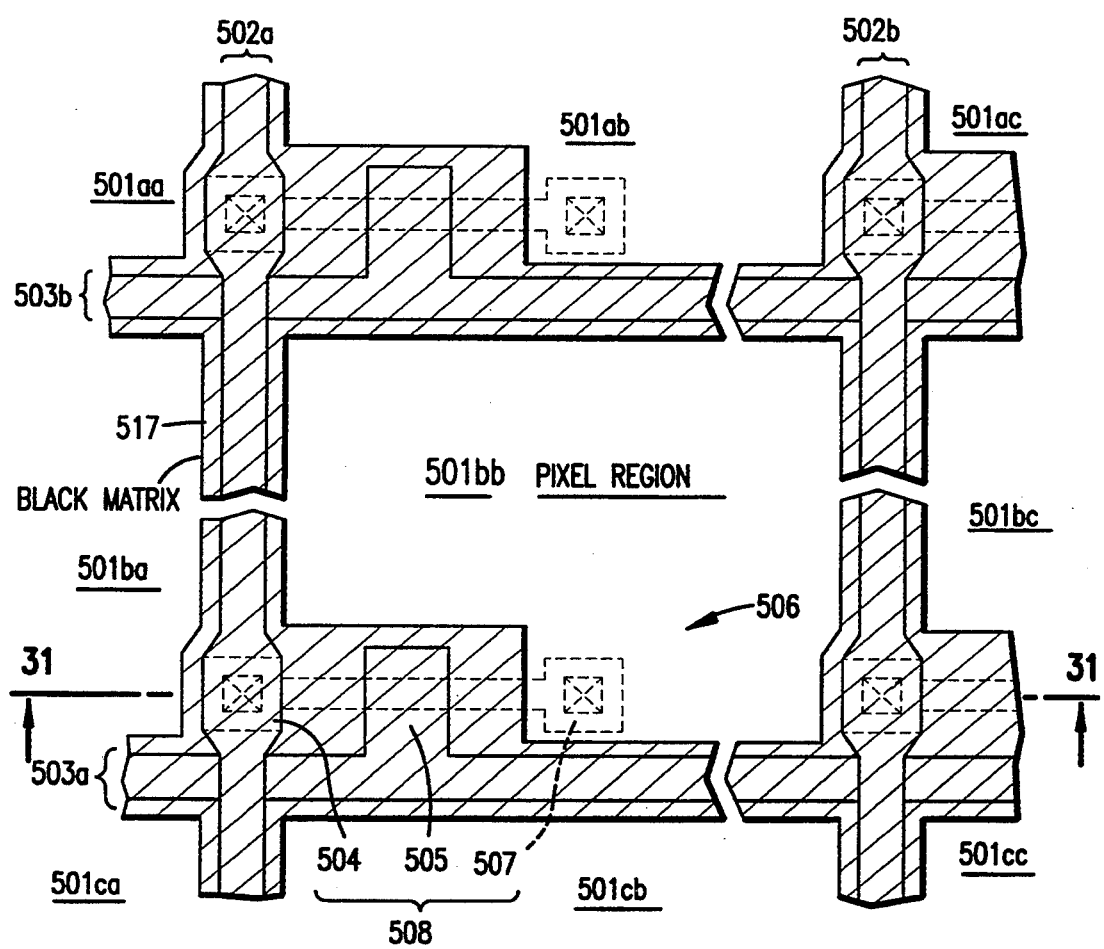
FIG. 30 is a plan view illustrating a portion of a matrix array of a liquid crystal display device according to a comparative example of the present invention.
Figure 31:
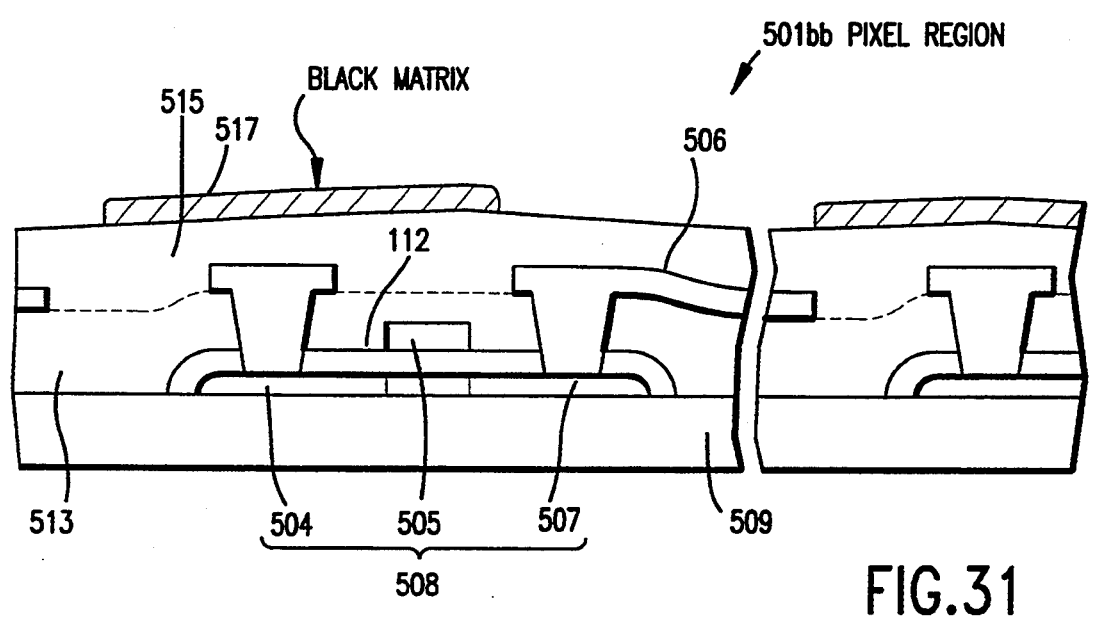
FIG. 31 is a cross sectional view taken along line 31—31 of FIG. 30.
Figure 8:
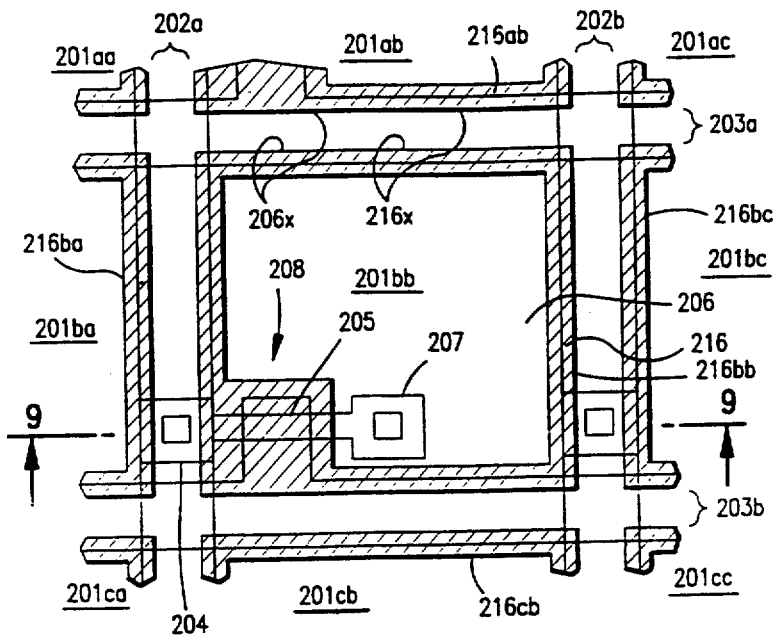
Figure 9:
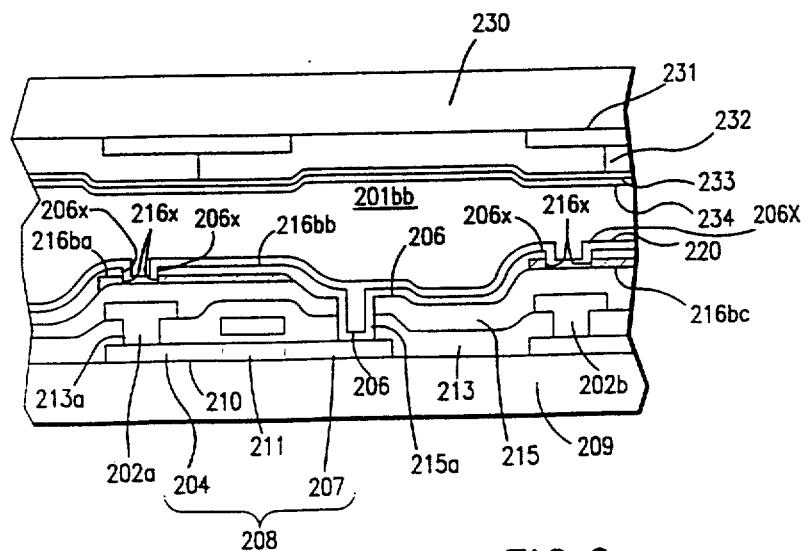
Figure 10A:
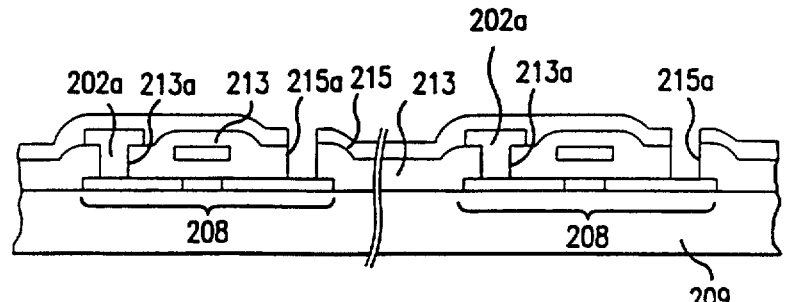
Figure 10B:
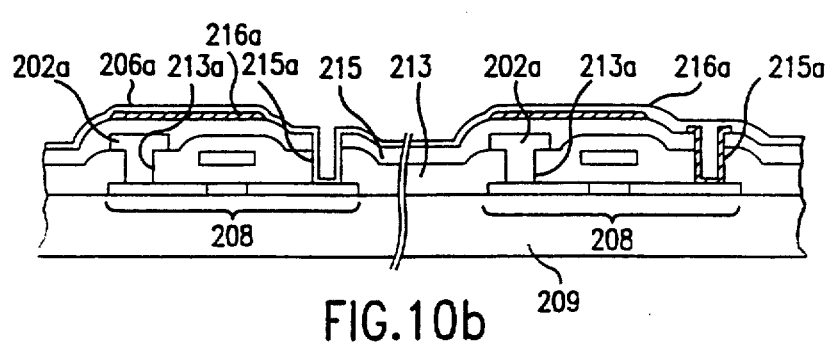
Figure 10C:
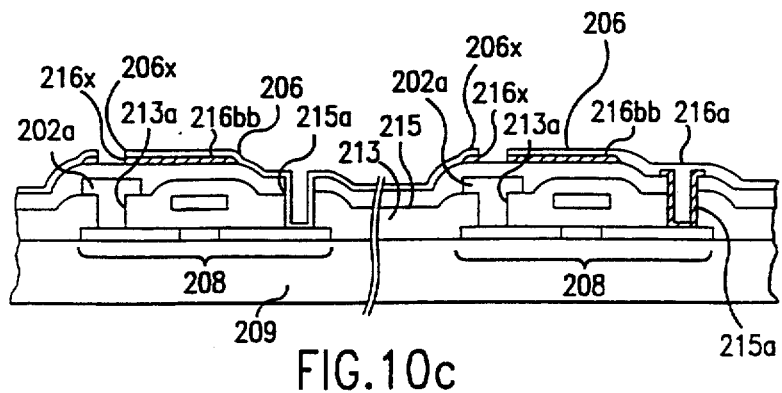
Figure 16:
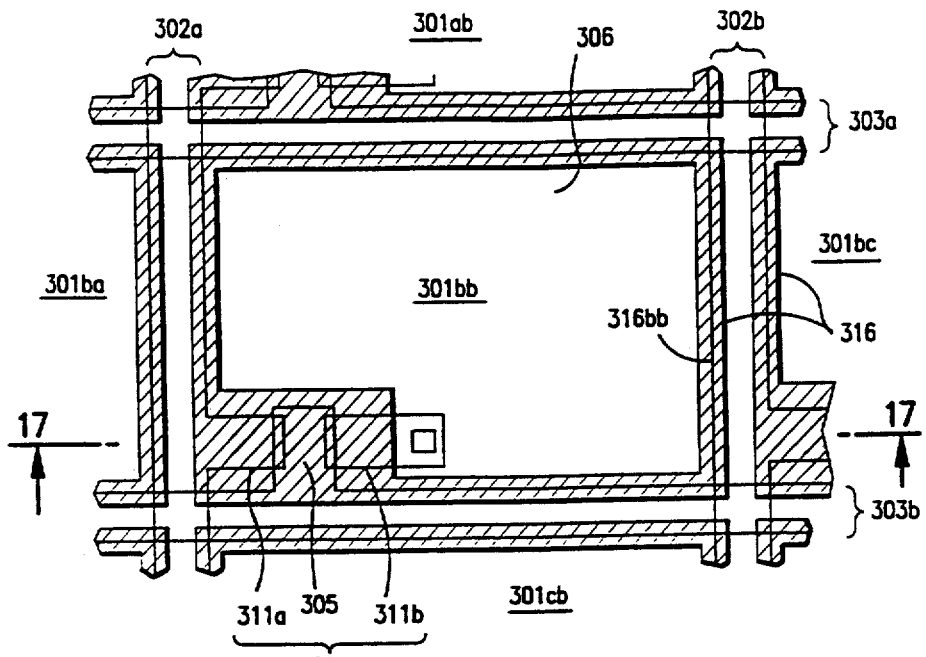
Figure 17:
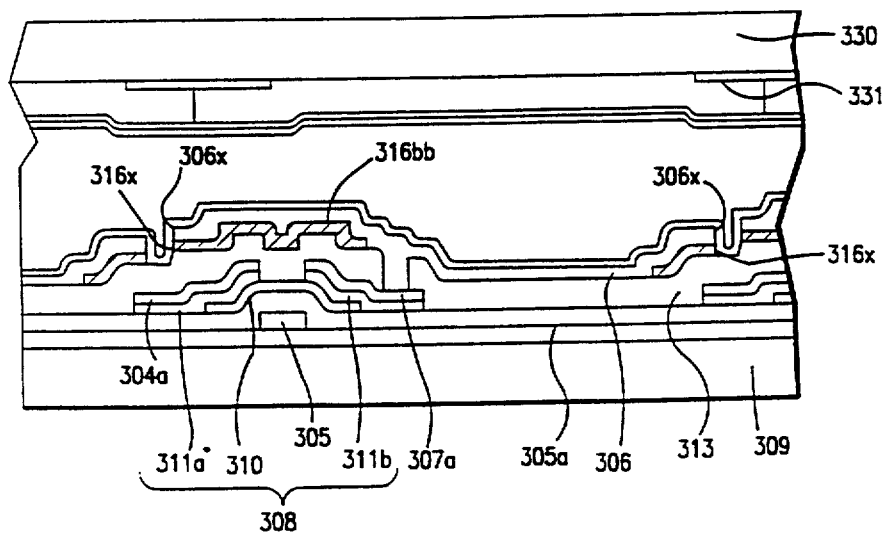
Figure 22:
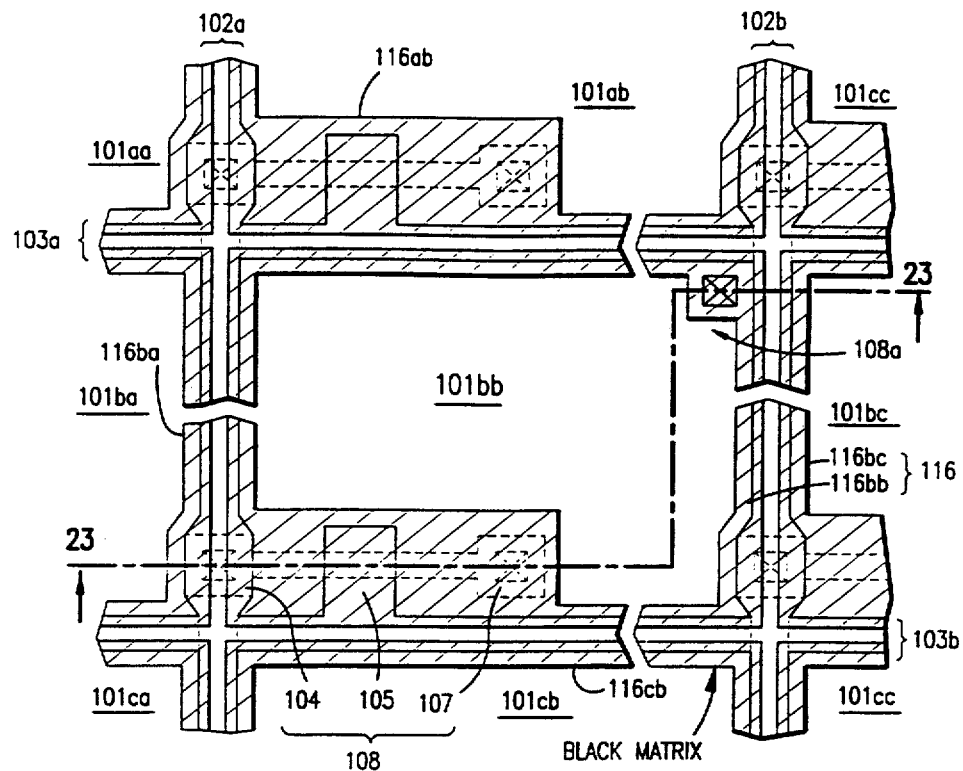
Figure 23:
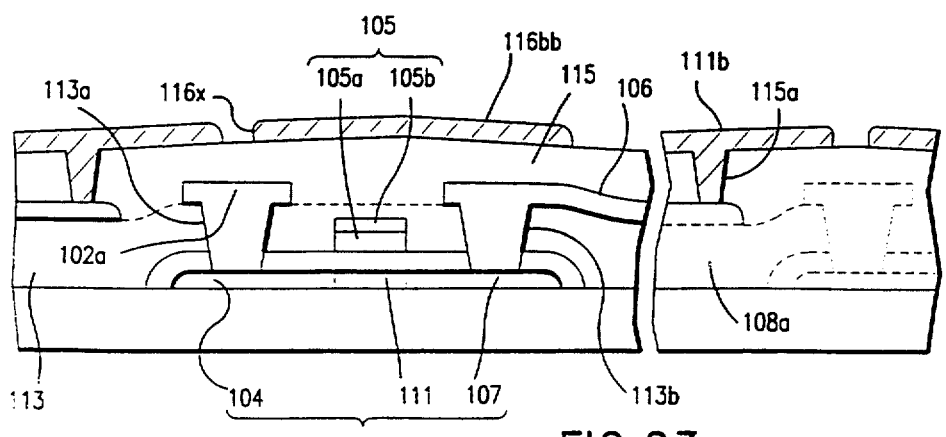
Figure 24:
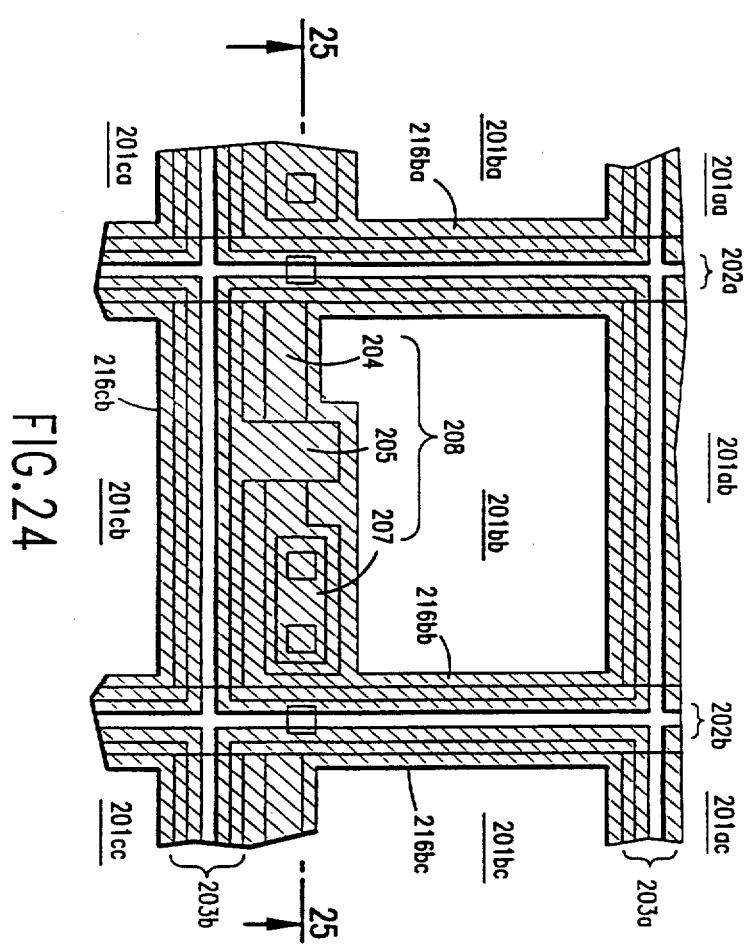
Figure 25:
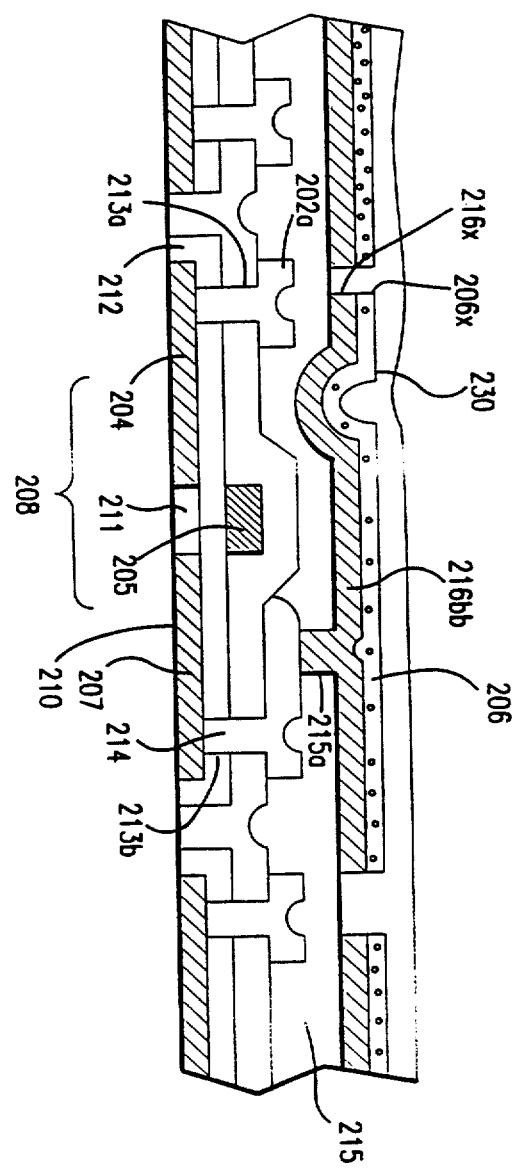

In the liquid crystal display device according to this embodiment, a drive circuit for actuating the active matrix array is formed on the surface of the transparent substrate 209 by a CMOS circuit as shown in FIGS. 26 and 27. FIG. 26 is a cross sectional view illustrating the CMOS circuit for the drive circuit. FIG. 27 is a plan view of the CMOS circuit.

As shown in the foregoing drawings, an n-channel-type TFT 410 and a p-channel-type TFT 420 are formed simultaneously with the active matrix portion. A fact that each of the gate electrode 205, the data line 202a and the pixel electrode 206 has, on the active matrix side, the lower-layer-side interlayer insulating film 213 or the upper-layer-side interlayer insulating film 215 between the layers thereof is utilized to also constitute a multi-layer wiring structure in the drive circuit portion. That is, the process until a gate electrode 441 adjacent to the drive circuit, a gate electrode wiring layer 442 adjacent to the drive circuit and the lower-layer-side interlayer insulating film 213 are formed is performed by utilizing respective processes. Then, the upper-layer-side interlayer insulating film 215 is formed after source lines 411 and 421 adjacent to the drive circuit have been formed. Then, connection holes 415a and 415b are formed in the upper-layer-side interlayer insulating film 215 and the lower-layer-side interlayer insulating film 213. An aluminum wiring layer 430 is electrically connected to drains 417 and 427 of the n-channel-type TFT 410 and the p-channel-type TFT 420 via the foregoing connection holes 415a and 415b. The element formed on the aluminum wiring layer 430 is a surface protection layer 230.

In the liquid crystal display device according to this embodiment structured as described above, each of the molybdenum silicide layers 216bb . . . also is utilized as the black matrix. Therefore, a similar effect to that obtainable from the liquid crystal display device according to Embodiment 8 can be obtained. Furthermore, the following effects can be obtained. That is, the fact that each of the gate electrode 205, the data line 202a and the pixel electrode 206 has, on the active matrix side, the lower-layer-side interlayer insulating film 213 or the upper-layer-side interlayer insulating film 215 between the layers thereof is utilized to form the aluminum wiring layer 430 having a multi-layer wiring structure to correspond to the drains 417 and 427 of the n-channel-type TFT 410 and the p-channel-type TFT 420. Therefore, a problem such as short circuit between the wiring layers does not take place. Furthermore, since the multilayer wiring structure is formed, the area required to form the drive circuit incorporating the n-channel-type TFT 410 and the p-channel-type TFT 420 can be reduced. If the area of the substrate is the same, the pixel region can be enlarged. If the area including the pixel is the same, the size of the overall body of the substrate, that is, the size of the liquid crystal display device can be reduced.

INDUSTRIAL APPLICABILITY

As described above, the liquid crystal display device according to the present invention is characterized in that a conductive and light shielding layer is formed on the surface of the transparent substrate in each pixel region, while being insulated and separated from the data line, the gate line and the pixel electrode of the adjacent pixel regions at the boundary regions among the adjacent pixel regions, while also being electrically connected to the pixel electrode in the same pixel region. The black matrix is constituted by the foregoing conductive and light shielding layers. Since the present invention has an arrangement in which the black matrix is, together with the matrix array, formed on the surface of the transparent substrate, the boundary region between the pixel regions and the black matrix can be aligned in terms of position with a satisfactory accuracy. Therefore, the margin of the width of the black matrix can be minimized, resulting in an improvement in the aperture ratio. Furthermore, since the conductive and light shielding layer is electrically connected to only the pixel electrode in the same pixel region, its potential is in a state in which the same potential is applied to it as is applied to the pixel electrode. Therefore, the potential of the black matrix does not disorder the state of orientation of the liquid crystal present between the pixel electrode and the common electrode, and therefore the quality of the display is excellent. Since the conductive and light shielding layers are electrically independent in each pixel region, the influence of a short circuit, if one were to occur between the conductive and light shielding layer and the data line or the like, causes only a point defect to occur in the display. Therefore, the reliability of the liquid crystal display device is excellent.

In the case where the conductive and light shielding layer is provided in two adjacent boundary regions among the boundary regions of the adjacent pixel regions, the conductive and light shielding layers are not disposed adjacent to each other over a wide range. Therefore, even if the conductive and light shielding layers are formed with an ordinary accuracy in the manufacturing process, short circuit between them can be prevented.

In the case where the outer end of the pixel electrode and that of the conductive and light shielding layer coincide with each other, the disorder of the orientation of the liquid crystal generated due to the influence of the electric field applied between the pixel electrode and the data line can be assuredly covered by the conductive and light shielding layer.

According to the present invention, if the data line formed on the lower-layer-side interlayer insulating film and the pixel electrode stacked by the conductive and light transmissible stacked electrode layer and formed on the upper-layer-side interlayer insulating film are provided, and its end portion is formed to reach a position above the data line, the data line and the pixel electrode are formed on different interlayer insulating films. Therefore, even if the pixel electrode is extended to reach the position above the data line, short circuit between them can be prevented. As a result, the portion adjacent to the data line can be made the display portion and therefore the aperture ratio of the pixel region can be raised. Furthermore, the pixel electrode exhibits the effect of shielding the data line. Therefore, the potential of the data line does not disorder the orientation of the liquid crystal. Hence, the quality of the display can be improved.

If the stacked electrode layer also has light transmissivity, formation of the stacked electrode layer does not lower the aperture ratio. Therefore, the stacked electrode layer can be extended to a region which is suitable to establish an electrical connection with the pixel electrode. In an illustrative case where the stacked electrode layer and the pixel region are electrically connected to each other in a region in which the thin film transistor is not formed, a structure is formed in which the electrical connection is established in a flat region. Therefore, the aforesaid connection portion has excellent reliability. By raising the flat region, the surface of the pixel electrode is flattened. Therefore, improvement of the state of orientation of the liquid crystal is exhibited.

In the case where the end portion of the pixel electrode of the conductive and light shielding layer is positioned above the forward gate line, the foregoing gate line and the pixel electrode form a charge storage capacitance. Consequently, the display holding characteristics can be improved.

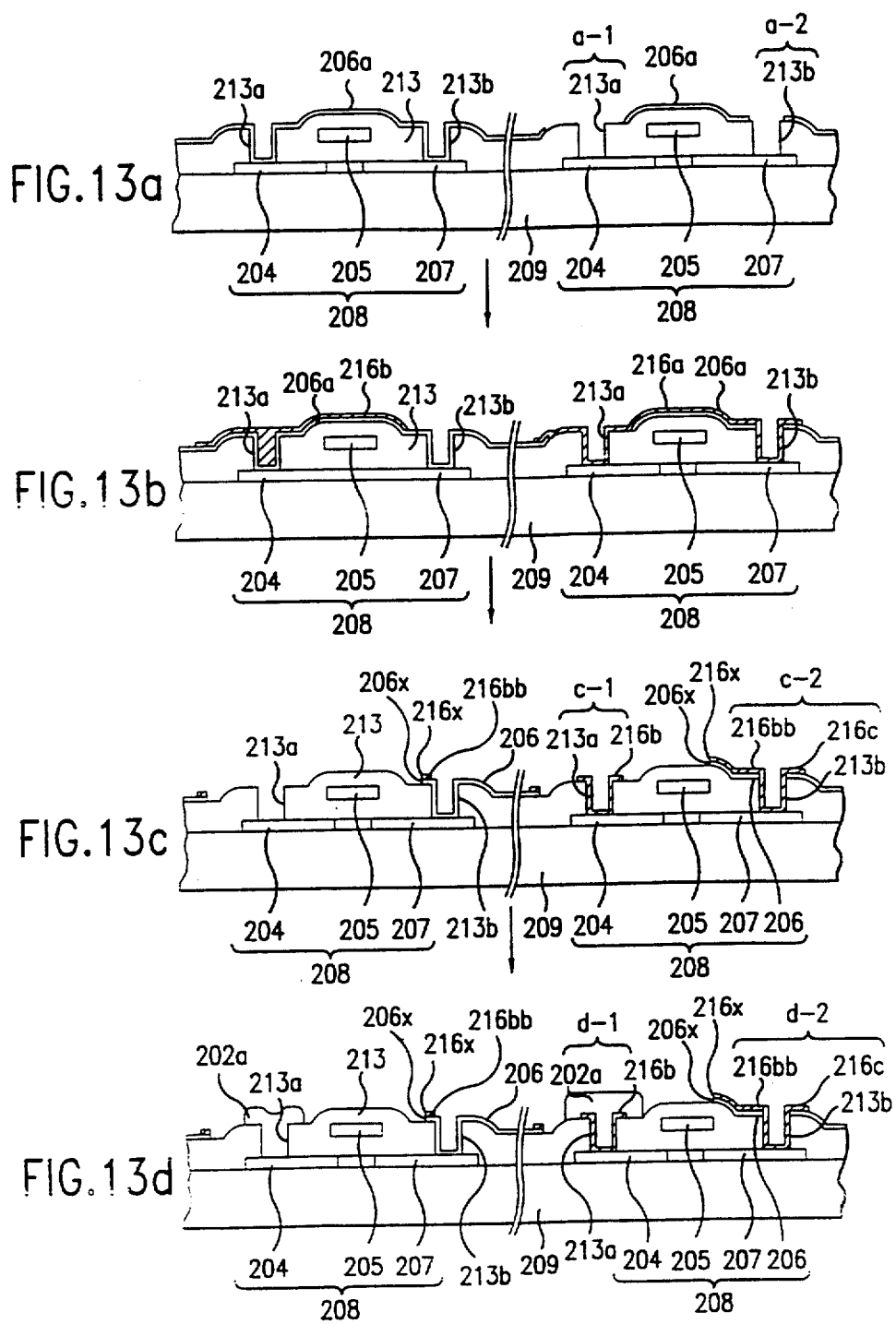

What is claimed is:

1. A liquid crystal display device comprising a transparent substrate, plural data lines and plural gate lines that section a surface of said transparent substrate into plural pixel regions, wherein a first of said plural pixel regions includes: a thin film transistor having a source electrode electrically connected to one of said data lines, a gate electrode electrically connected to one of said gate lines, a pixel electrode electrically coupled to a drain of said thin film transistor, and wherein at least one boundary between said first pixel region and adjacent second pixel regions includes an electrically conductive and light shielding layer extending along at least about ½ of one side of the first pixel region and insulated and separated from said data lines and said gate lines, and electrically connected to said pixel electrode of said first pixel region.

2. A liquid crystal display device according to claim 1, wherein said conductive and light shielding layer has an outer edge positioned on a boundary region of said at least one boundary between said first pixel region and said second pixel regions.

3. A liquid crystal display device according to claim 1, wherein said conductive and light shielding layer of said first pixel region is located in each boundary region that said first pixel region has with said adjacent second pixel regions, and said first pixel region is sectioned from said second pixel regions by said conductive and light shielding layer.

4. A liquid crystal display device according to claim 1, wherein said conductive and light shielding layer of said first pixel region is located in two boundary regions that said first pixel region has with said adjacent second pixel regions, and said first pixel region is sectioned from said adjacent second pixel regions by said conductive and light shielding layer and by additional conductive and light shielding layers located adjacent to two other boundary regions adjacent that said first pixel region has with said adjacent second pixel regions.

5. A liquid crystal display device according to claim 1, wherein substantially most of the surface of said data line electrically coupled to the source electrode of said first pixel region is covered with at least one of said conductive and light shielding layer of said first pixel region and a conductive and light shielding layer of one of said second pixel regions adjacent to said first pixel region.

6. A liquid crystal display device according to claim 1, wherein one of said pixel electrode and said conductive and light shielding layer is electrically connected to said drain via a connection hole in an interlayer insulating film located over said drain, and also is electrically connected to the other one of said pixel electrode and said conductive and light shielding layer.

7. A liquid crystal display device according to claim 6, wherein said pixel electrode and said conductive and light shielding layer are formed adjacent to an upper-layer-side interlayer insulating film that is formed on a surface of a lower-layer-side interlayer insulating film, and are electrically connected to each other via a connection hole located in said upper-layer-side interlayer insulating film.

8. A liquid crystal display device according to claim 6, wherein one of said pixel electrode and said conductive and light shielding layer is at least partially formed on a surface of the other so that said pixel electrode and said conductive and light shielding layer are electrically connected.

9. A liquid crystal display device according to claim 8, wherein the outer edges of said pixel electrode and said conductive and light shielding layer substantially coincide with each other.

10. A method of manufacturing the liquid crystal display device according to claim 9, comprising a step of patterning a lower one of said pixel electrode and said conductive and light shielding layer in a manner so that an outer edge of an upper one of said pixel electrode and said conductive and light shielding layer is used as masks to pattern said lower one of said pixel electrode and said conductive and light shielding layer.

11. A liquid crystal display device according to claim 1, wherein one of said pixel electrode and said conductive and light shielding layer is electrically connected to said drain via an electrically conductive stacked electrode layer that is electrically connected to said drain via a connection hole in an interlayer insulating film located on said drain, and also is electrically 12. A liquid crystal display device according to claim 11, wherein said stacked electrode layer also has light transmissivity.

13. A liquid crystal display device according to claim 12, wherein both said stacked electrode layer and said pixel electrode are formed by ITO layers.

14. A liquid crystal display device according to claim 12, wherein said pixel electrode has an outer edge positioned above said data line.

15. A liquid crystal display device according to claims 11, wherein said stacked electrode layer is formed to reach a non-formation region in which said thin film transistor is not formed, and said pixel electrode is electrically connected to said stacked electrode layer in said non-formation region.

16. A liquid crystal display device according to claim 11, wherein said data line electrically connected to said source electrode includes: a first data line electrically connected to said source electrode of said thin film transistor via a first connection hole in said interlayer insulating film, and a second data line electrically connected to a surface of said first data line to form a multi-layer wiring structure; and said stacked electrode layer includes: a first stacked electrode layer electrically connected to said drain of said thin film transistor via a second connection hole in said interlayer insulating film and a second stacked electrode layer electrically connected to a surface of said first stacked electrode layer.

17. A liquid crystal display device according to claim 16, wherein said first data line and said first stacked electrode layer are made of a same material, and said second data line and said second stacked electrode layer also are made of a same material.

18. A liquid crystal display device according to claim 11, wherein a drive circuit is formed on said transparent substrate, and includes a multi-layer wiring structure in which wiring layers are electrically connected through said interlayer insulating film.

19. A liquid crystal display device according to claim 1, wherein said gate electrode and said gate line connected to said gate electrode have a layer containing phosphorus by an amount no greater than $1 \times 10^{20}/cm^3$, and a silicide layer made of a high melting point metal formed on a surface of said silicon layer and forming a multi-layer wiring structure.

20. A method of manufacturing the liquid crystal display device according to claim 19 comprising: a step of forming a first polycrystalline silicon film to serve as a source and drain region and a channel region on the surface of said transparent substrate; a step of forming a gate electrode insulating film on a surface of said polycrystalline silicon film; a step of depositing a second polycrystalline silicon film to serve said gate electrode and said gate line; a step of dispersing phosphorus in said second polycrystalline silicon film at a temperature of no greater than 850° C.; a step of depositing a silicide layer of high melting point metal above said polycrystalline silicon film; and a step of simultaneously patterning said second polycrystalline silicon film and said silicide layer of said high melting point metal to form said gate electrode and said gate line.

21. A liquid crystal display device according to claim 1, wherein at least one of said pixel electrode and said conductive and light shielding layer has an outer edge adjacent to a forward gate line at a position above said forward gate line.

22. The liquid crystal display device of claim 1, wherein a part of the data lines, a part of the gate lines, and a part of the electrically conductive and light shielding layer substantially surround the pixel electrode forming a black matrix.

23. A liquid crystal display device comprising a transparent substrate, plural data lines and plural gate lines that section a surface of said transparent substrate into plural pixel regions, wherein each of said plural pixel regions includes:
  a thin film transistor having a source electrode, a gate electrode, and a drain electrode, one of said source electrode and said drain electrode being electrically connected to one of said data lines, said gate electrode electrically connected to one of said gate lines;
  a pixel electrode electrically coupled to another of said source electrode and said drain electrode of said thin film transistor; and
  an electrically conductive and light shielding layer located at least at a boundary between the pixel region and at least one adjacent pixel region, said electrically conductive and light shielding layer extending along at least about ½ of one side of the pixel region and insulated and separated from said data lines and said gate lines, and electrically connected to the pixel electrode.

24. A liquid crystal display device according to claim 23, wherein the electrically conductive and light shielding layer of each pixel region entirely surrounds the corresponding pixel electrode of the pixel region.

25. A liquid crystal display device according to claim 23, wherein the electrically conductive and light shielding layer of each pixel region is located on two sides of the corresponding pixel electrode of the pixel region.

26. A liquid crystal display device according to claim 25, wherein the electrically conductive and light shielding layer of each pixel region is located on two opposite sides of the corresponding pixel electrode of the pixel region.

27. A liquid crystal display device according to claim 23, wherein the electrically conductive and light shielding layers of the pixel regions on said substrate substantially cover the data lines and the gate lines on said substrate.

28. A liquid crystal display device according to claim 23, further comprising an interlayer insulating film located over said thin film transistor, said pixel electrodes of the pixel regions electrically coupled to said drain electrode through a connection hole in said interlayer insulating film.

29. A liquid crystal display device according to claim 28, wherein the pixel electrode and the conductive and light shielding layer of each pixel region are located on a surface of said interlayer insulating film, and are electrically attached to each other.

30. A liquid crystal display device according to claim 23, further comprising an interlayer insulating film located over said thin film transistor, said conductive and light shielding layers of the pixel regions electrically coupled to said drain electrode through a connection hole in said interlayer insulating film.

31. A liquid crystal display device according to claim 30, wherein the pixel electrode and the conductive and light shielding layer of each pixel region are located on a surface of said interlayer insulating film, and are electrically attached to each other.

32. A liquid crystal display device comprising a transparent substrate, plural data lines that section a surface of said transparent substrate into plural pixel regions, wherein each of said plural pixel regions includes:
  a pixel electrode electrically coupled to one of said plural data lines; and
  an electrically conductive and light shielding layer extending along at least about ½ of one side of the first pixel region and located at least at a boundary between the pixel region and at least one adjacent pixel region, said electrically conductive and light shielding layer insulated and separated from said data lines and electrically connected to the pixel electrode.

33. The liquid crystal display device of claim 23, wherein a part of the data lines, a part of the gate lines, and a part of the electrically conductive and light shielding layer substantially surround the pixel electrode forming a black matrix.

34. The liquid crystal display device of claim 32, wherein a part of the data lines, a part of a plurality of gate lines, and a part of the electrically conductive and light shielding layer substantially surround the pixel electrode forming a black matrix.

* * * * *

UNITED STATES PATENT AND TRADEMARK OFFICE
CERTIFICATE OF CORRECTION

PATENT NO. : 5,414,547
DATED : May 9, 1995
INVENTOR(S) : Mutsumi Matsuo et al

It is certified that error appears in the above-indentified patent and that said Letters Patent is hereby corrected as shown below:

<u>In the Drawings</u>:

Drawing sheets consisting of Figures 8,9,10A-10C, 13a-13d, 16, 17, 22, 23, 24 and 25.

Col. 26, line 34, delete "surface of the trans-";

line 35, change "parent substrate 109" to --lower-layer-side interlayer insulating film 113--.

Col. 26, line 49, change "lower-layer side" to --lower-layer-side--.

Signed and Sealed this

Thirteenth Day of February, 1996

Attest:

BRUCE LEHMAN

Attesting Officer

Commissioner of Patents and Trademarks